(12) United States Patent
Hiraoka

(10) Patent No.: US 11,112,014 B2
(45) Date of Patent: Sep. 7, 2021

(54) TWO-WAY VALVE FOR FLOW RATE CONTROL AND TEMPERATURE CONTROL DEVICE USING THE SAME

(71) Applicant: SHINWA CONTROLS CO., LTD., Kawasaki (JP)

(72) Inventor: Katsumichi Hiraoka, Kawasaki (JP)

(73) Assignee: SHINWA CONTROLS CO., LTD., Kawasaki (JP)

( * ) Notice: Subject to any disclaimer, the term of this patent is extended or adjusted under 35 U.S.C. 154(b) by 0 days.

(21) Appl. No.: 16/086,280

(22) PCT Filed: May 15, 2017

(86) PCT No.: PCT/JP2017/018201
§ 371 (c)(1),
(2) Date: Sep. 18, 2018

(87) PCT Pub. No.: WO2018/096712
PCT Pub. Date: May 31, 2018

(65) Prior Publication Data
US 2020/0124187 A1 Apr. 23, 2020

(30) Foreign Application Priority Data

Nov. 22, 2016 (JP) .............................. JP2016-226423

(51) Int. Cl.
*F16K 11/22* (2006.01)
*F16K 3/26* (2006.01)
(Continued)

(52) U.S. Cl.
CPC .................. *F16K 3/26* (2013.01); *F16K 5/04* (2013.01); *G05D 7/06* (2013.01)

(58) Field of Classification Search
CPC ... F16K 3/26; F16K 3/262; F16K 3/34; F16K 5/0414; F16K 5/12; F16K 11/085; F16K 27/041
(Continued)

(56) References Cited

U.S. PATENT DOCUMENTS 1,469,421 A * 10/1923 Lenz ...................... F16K 27/062
251/184
3,700,210 A * 10/1972 Manoogian ............. F16K 5/061
251/304
(Continued)

FOREIGN PATENT DOCUMENTS

CN 104847958 A 8/2015
EP 2 103 852 A2 9/2009
(Continued)

OTHER PUBLICATIONS

International Preliminary Report on Patentability and Written Opinion dated Jun. 6, 2019, in PCT/JP2017/018201 (Forms PCT/IB/338, PCT/IB/373, and PCT/ISA/237).
(Continued)

*Primary Examiner* — Reinaldo Sanchez-Medina
(74) *Attorney, Agent, or Firm* — Birch, Stewart, Kolasch & Birch, LLP

(57) ABSTRACT

Provided are a two-way valve for flow rate control and a temperature control device using the same, which can linearly control a flow rate of a fluid with good accuracy as compared to a switching valve in which a communication hole is simply formed in a valve element so as to open a flow passage through alignment with an outflow portion. The two-way valve for flow rate control, includes: a valve main body (6), which includes a valve seat (8) having a columnar space, and has a first valve port (9) formed in one end portion of the valve main body in an axial direction of the valve seat (8) so as to allow flow of a fluid, and a second
(Continued)

valve port (11) that is formed in a peripheral wall of the valve seat (8) to allow flow of the fluid and has a rectangular cross section; a valve element (12), which is arranged in a freely rotatable manner in the valve seat (8) of the valve main body (6), and has a shape forming a part of a cylindrical shape having a predetermined central angle ($\alpha$) so as to linearly change an opening area of the second valve port (11); and drive means (3) configured to rotate and drive the valve element (12).

3 Claims, 26 Drawing Sheets

(51) Int. Cl.
  *F16K 5/04*    (2006.01)
  *G05D 7/06*    (2006.01)
(58) Field of Classification Search
  USPC .......................................... 251/207, 209, 310
  See application file for complete search history.

(56) References Cited

U.S. PATENT DOCUMENTS

| | | | | |
|---|---|---|---|---|
| 4,175,586 A * | 11/1979 | Hayman | ............... | F16K 5/0414 |
| | | | | 137/454.6 |
| 4,319,735 A * | 3/1982 | Moen | ............... | F16K 5/0428 |
| | | | | 251/175 |
| 4,453,567 A * | 6/1984 | MacDonald | ............... | F16K 3/08 |
| | | | | 137/614.11 |
| 4,545,399 A * | 10/1985 | McGhee | ............... | F16K 5/0414 |
| | | | | 137/315.13 |
| 4,577,835 A * | 3/1986 | Holycross, Jr. | ....... | F16K 5/0414 |
| | | | | 137/614.11 |
| 4,699,358 A * | 10/1987 | Iqbal | ............... | F16K 47/045 |
| | | | | 251/310 |
| 4,791,962 A * | 12/1988 | Moen | ............... | F16K 5/0414 |
| | | | | 137/625.17 |
| 6,119,719 A * | 9/2000 | Viegener | ............... | F16K 5/0414 |
| | | | | 137/454.5 |
| 2004/0079913 A1 * | 4/2004 | Lawson | ............... | A61B 5/087 |
| | | | | 251/129.11 |

FOREIGN PATENT DOCUMENTS

| | | |
|---|---|---|
| JP | 59-63265 U | 4/1984 |
| JP | 64-6567 A | 1/1989 |
| JP | 1-126486 U | 8/1989 |
| JP | 5-66375 U | 9/1993 |
| JP | 6-249361 A | 9/1994 |
| JP | 2008-64404 A | 3/2008 |
| JP | 2012-36925 A | 2/2012 |
| KR | 10-2012-0009187 A | 2/2012 |

OTHER PUBLICATIONS

International Search Report for PCT/JP2017/018201 (PCT/ISA/210) dated Jun. 6, 2017.
Written Opinion of the International Searching Authority for PCT/JP2017/018201 (PCT/ISA/237) dated Jun. 6, 2017.

\* cited by examiner (a)

(b)

(a)

(b)

(c)

(a)

(b)

(a)

(b)

OUTPUT VOLTAGE

ROTATION ANGLE θ

(a)

(b)

(a)

(b)

TWO-WAY VALVE FOR FLOW RATE CONTROL AND TEMPERATURE CONTROL DEVICE USING THE SAME

TECHNICAL FIELD

The present invention relates to a two-way valve for flow rate control and a temperature control device using the same.

BACKGROUND ART

Hitherto, as a technology relating to a two-way valve for flow rate control, there have already been proposed, for example, two-way valves for flow rate control disclosed in Patent Literature 1 and Patent Literature 2.

In Patent Literature 1, there is described a switching valve having the following configuration. A tubular valve element having an open end is provided in a freely rotatable manner in a main body, and the open end serves as an inflow portion. A plurality of outflow portions are formed in a peripheral wall of the main body. Further, a communication hole is formed in the valve element, and is configured to open a flow passage through alignment with the outflow portions. In the switching valve, a sealing member made of an elastic material is integrated with the peripheral wall of the valve element with the communication hole so as to have a size smaller than an inner peripheral wall of the main body, and projections are formed on portions of the sealing member corresponding to opening edges of the communication hole so as to project toward the inner peripheral wall of the main body.

In Patent Literature 2, there is described a two-way valve having the following configuration. The two-way valve includes a valve body, a cylindrical valve element, and a case. The valve body has a cylindrical valve-element accommodation space and a plurality of communication ports communicating with the valve-element accommodation space in a radial direction. The cylindrical valve element has a plurality of valve ports communicable with the plurality of communication ports of the valve body, respectively. The valve element is turned by drive means in a state of being accommodated in the valve-element accommodation space of the valve body, thereby switching the plurality of communication ports of the valve body and the plurality of valve ports to any one of a communication state and a non-communication state. The case has a fluid inflow port, and a fluid outflow port and is configured to accommodate the valve body. A pressure-equalizing passage is formed in an entire peripheral space between an outer peripheral surface of the valve body and an inner peripheral surface of the case. The pressure-equalizing passage communicates with the fluid inflow port or the fluid outflow port. When the plurality of communication ports of the valve body and the plurality of valve ports are in the communication state, a fluid flows from the fluid inflow port to the fluid outflow port. When the plurality of communication ports of the valve body and the plurality of valve ports are in the non-communication state, a pressure of the fluid is applied to an outer peripheral surface of the valve element through the plurality of communication ports of the valve body.

CITATION LIST

Patent Literature

[PTL 1] JP 64-6567 A
[PTL 2] JP 2012-36925 A

SUMMARY OF INVENTION

Technical Problem

The present invention has an object to provide a two-way valve for flow rate control, which is capable of linearly controlling a flow rate of a fluid with higher accuracy as compared to a switching valve in which a communication hole is simply formed in a valve element so as to open a flow passage through alignment with an outflow portion, and to provide a temperature control device using the same.

Solution to Problem

According to the invention of claim 1, provided is a two-way valve for flow rate control, including: a valve main body, which includes a valve seat having a columnar space, and has a first valve port formed in one end portion of the valve main body in an axial direction of the valve seat so as to allow flow of a fluid, and a second valve port that is formed in a peripheral wall of the valve seat to allow flow of the fluid and has a rectangular cross section; a valve element, which is arranged in a freely rotatable manner in the valve seat of the valve main body, and has a shape forming a part of a cylindrical shape having a predetermined central angle so as to linearly change an opening area of the second valve port; and drive means configured to rotate and drive the valve element.

According to the invention of claim 2, in a two-way valve for flow rate control as described in claim 1, the valve body is formed of a cylindrical body having a half-cylindrical portion, which is formed into a half-cylindrical shape having a predetermined central angle by opening an outer peripheral surface of the cylindrical body, and having one end surface in an axial direction being closed and another end surface being opened.

According to the invention of claim 3, provided is a temperature control device, including: temperature control means having a flow passage for temperature control which allows a fluid for temperature control to flow therethrough, the fluid for temperature control including a lower temperature fluid and a higher temperature fluid adjusted in a mixture ratio; first supply means configured to supply the lower temperature fluid adjusted to a first predetermined lower temperature; second supply means configured to supply the higher temperature fluid adjusted to a second predetermined higher temperature; a mixing portion configured to mix the lower temperature fluid supplied from the first supply means and the higher temperature fluid supplied from the second supply means, and then cause a mixture of the lower temperature fluid and the higher temperature fluid to flow through the flow passage for temperature control; a first flow rate control valve configured to control a flow rate of the lower temperature fluid supplied from the first supply means; and a second flow rate control valve configured to control a flow rate of the higher temperature fluid supplied from the second supply means, in which the two-way valve for flow rate control of claim 1 or 2 is used as each of the first flow rate control valve and the second flow rate control valve.

Advantageous Effects of Invention

According to the present invention, there can be provided the two-way valve for flow rate control, which is capable of linearly controlling the flow rate of the fluid with higher accuracy as compared to the switching valve in which the communication hole is simply formed in the valve element so as to open the flow passage through alignment with the outflow portion, and the temperature control device using the same.

DESCRIPTION OF EMBODIMENTS

In the following, an embodiment of the present invention is described with reference to the drawings.

First Embodiment

Figure 1:
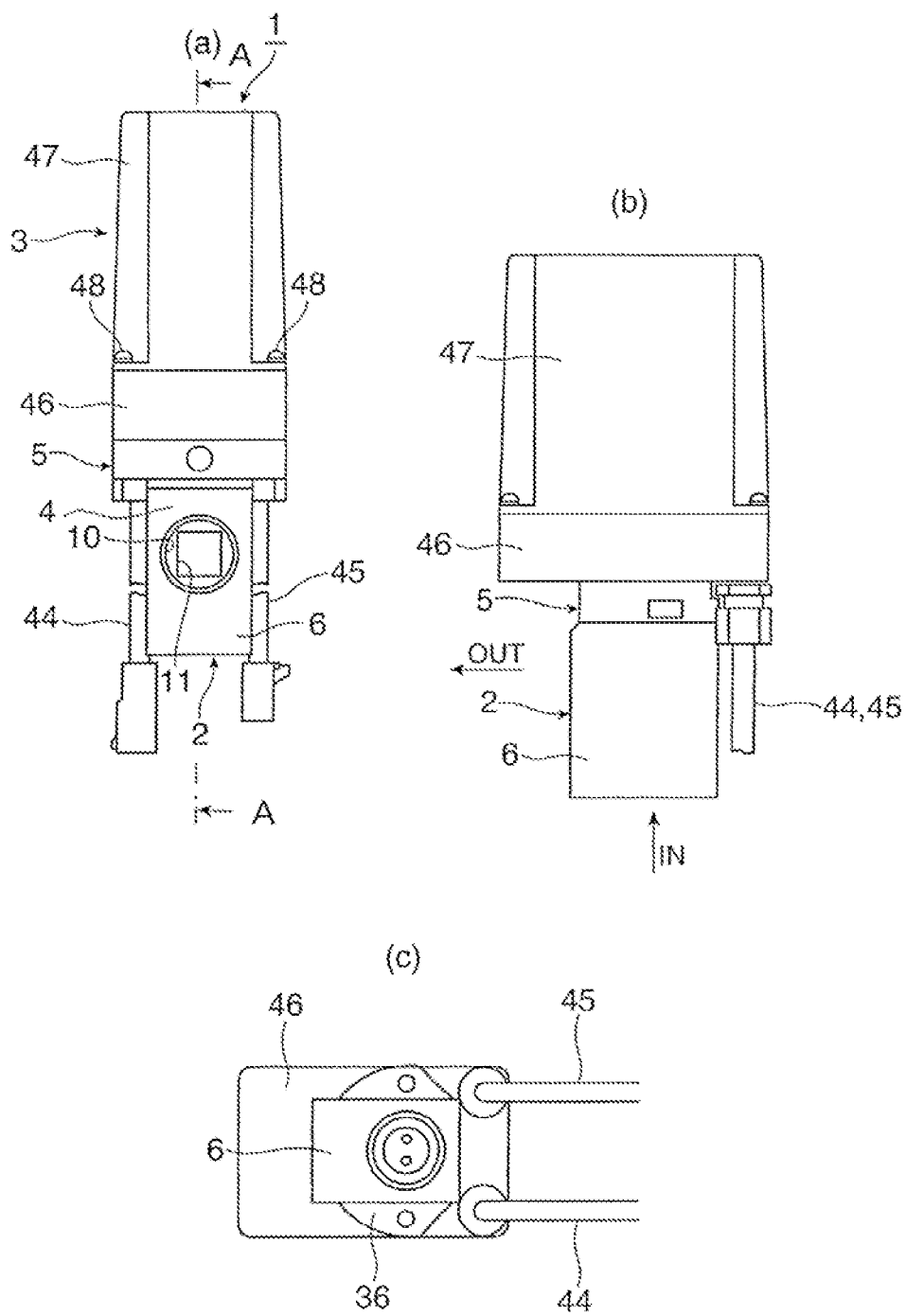
FIG. 1 are configuration views for illustrating a two-way motor valve as one example of a two-way valve for flow rate control according to a first embodiment of the present invention.
Figure 2:
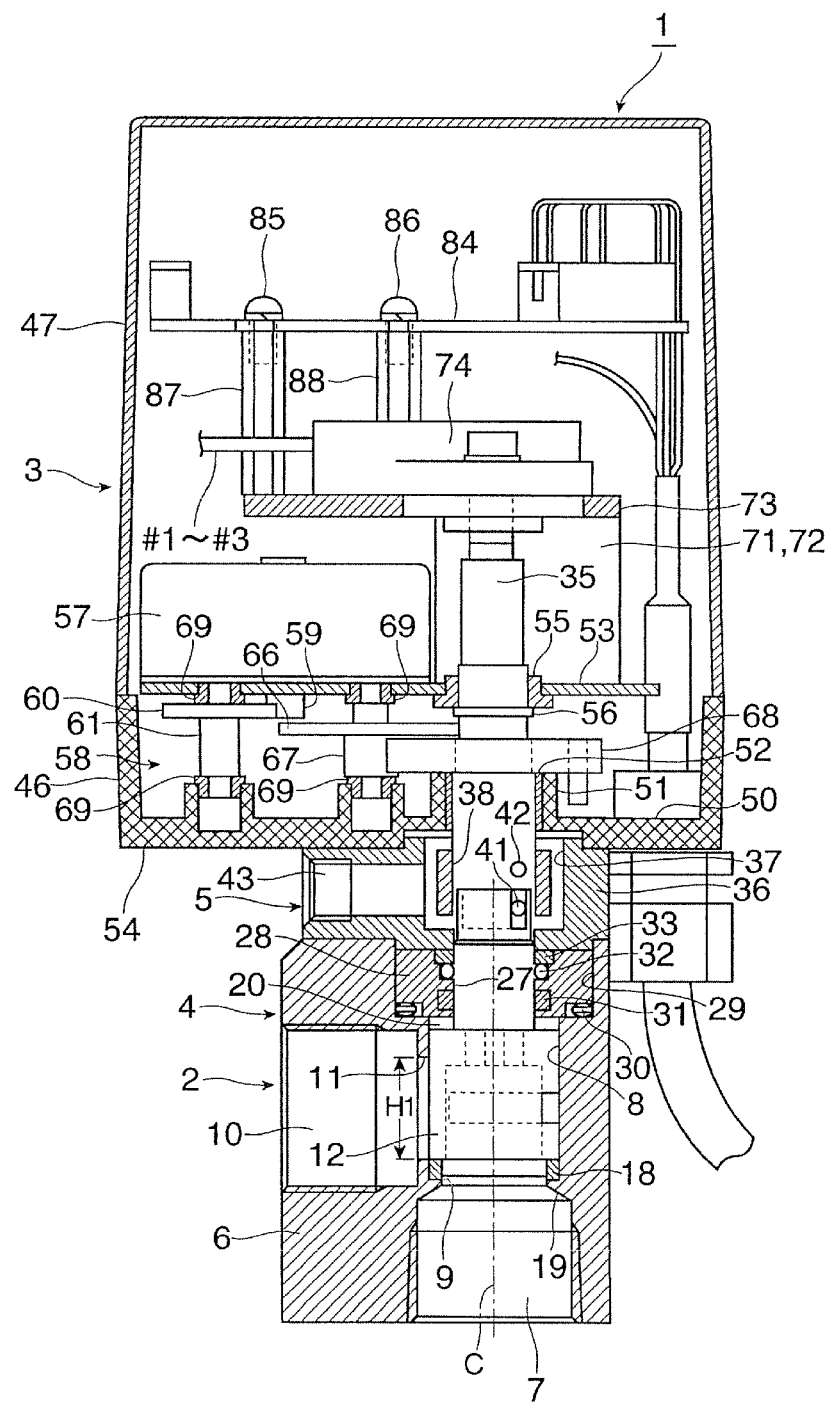
FIG. 2 is a sectional view for illustrating the two-way motor valve as one example of the two-way valve for flow rate control according to the first embodiment of the present invention.

FIG. 1(a), FIG. 1(b), and FIG. 1(c) are views for illustrating a two-way motor valve being one example of a two-way valve for flow rate control according to a first embodiment of the present invention. FIG. 1(a) is a front view. FIG. 1(b) is a right side view. FIG. 1(c) is a bottom view. FIG. 2 is a sectional view taken along the line A-A of FIG. 1(a). FIG. 3(a) is a plan view for illustrating main parts of the two-way motor valve. FIG. 3(b) is a front view for illustrating the two-way motor valve being partially cut.

A two-way motor valve 1 is constructed as a rotary two-way valve. As illustrated in FIG. 1, the two-way motor valve 1 mainly includes a valve portion 2 arranged at a lower portion thereof, an actuator 3 arranged at an upper portion thereof, and a sealing portion 4 and a coupling portion 5, which are arranged between the valve portion 2 and the actuator 3.

Figure 3:
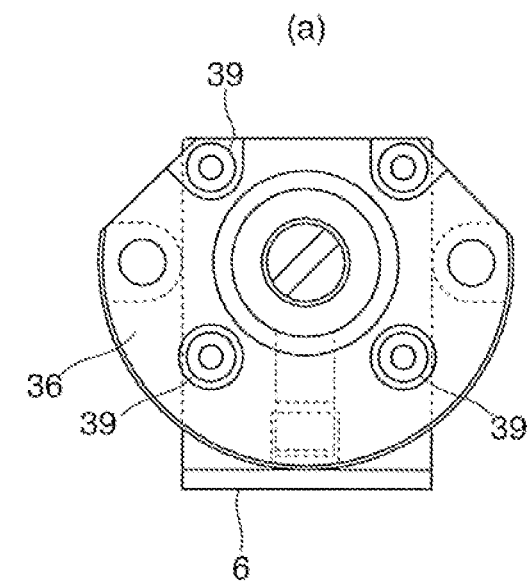
FIG. 3 are configuration views for illustrating main parts of the two-way motor valve as one example of the two-way valve for flow rate control according to the first embodiment of the present invention.
Figure 3:
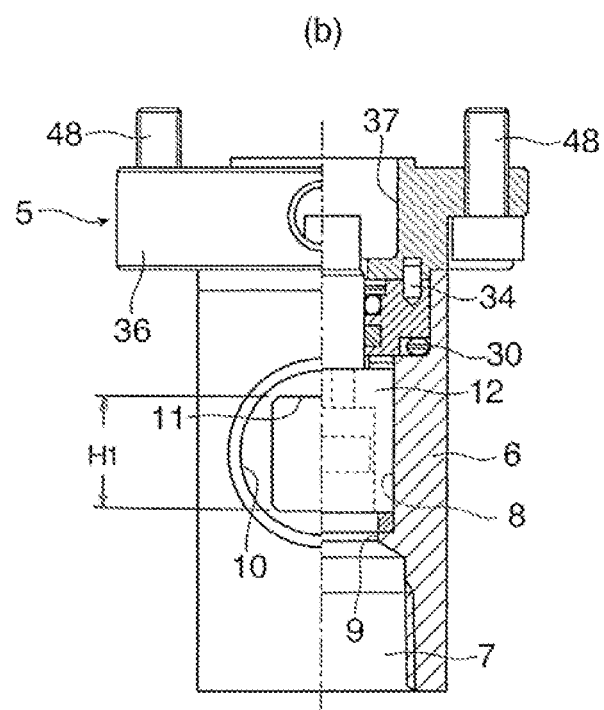

As illustrated in FIG. 1 to FIG. 3, the valve portion 2 includes a valve main body 6 obtained by forming metal, for example, SUS, into a substantially rectangular parallelepiped shape. An inflow port 7 and a first valve port 9 are formed in a bottom surface of the valve main body 6. A pipe (not shown) is connected to the inflow port 7 configured to allow flow (inflow) of a fluid. The first valve port 9 communicates with a valve seat 8 having a columnar space. The first valve port 9 has a circular cross section having a diameter smaller than that of the valve seat 8. An inner periphery of the inflow port 7 is set to, for example, Rc ¾ being a standard for a tapered female thread having a bore diameter of around 24 mm.

Figure 4:
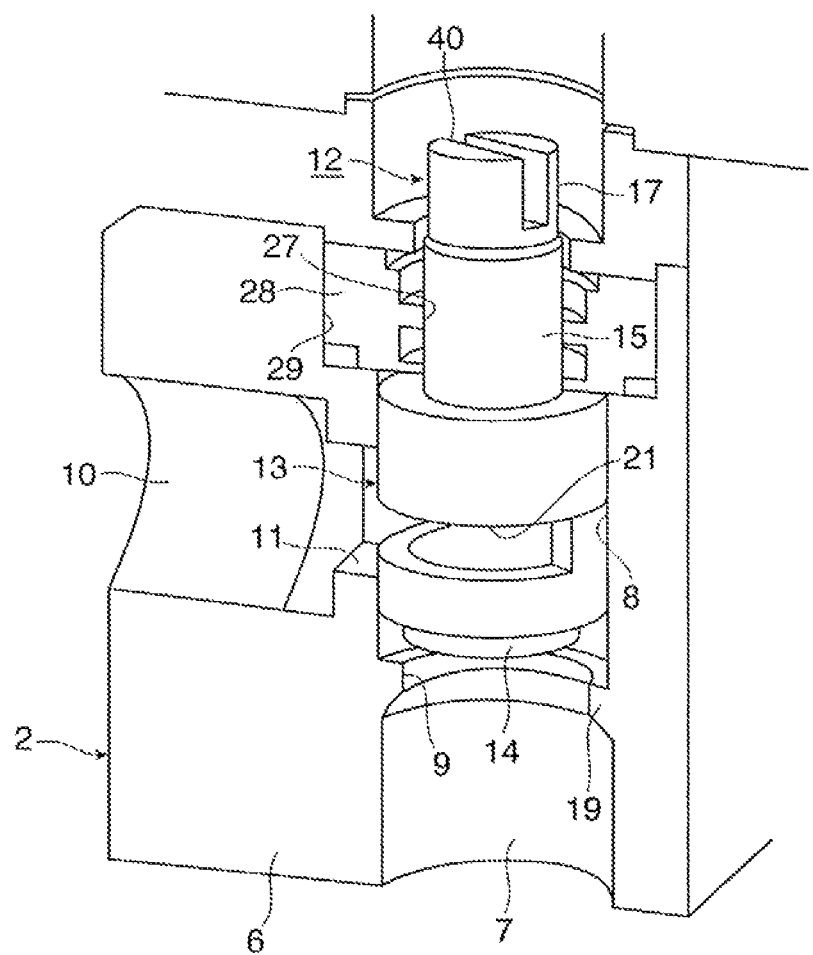
FIG. 4 is a sectional perspective view for illustrating main parts of the two-way motor valve as one example of the two-way valve for flow rate control according to the first embodiment of the present invention.

An outflow port 10 and a second valve port 11 are formed in one of side surfaces (front surface in the illustrated example) of the valve main body 6. A pipe (not shown) is connected to the outflow port 10, which has a circular cross section and is configured to allow outflow of the fluid. The second valve port 11 communicates with the valve seat 8 having a columnar space. The second valve port 11 has a rectangular cross section (square cross section in the illustrated example) substantially inscribed in the outflow port 10. The second valve port 11 is formed so as to penetrate into the valve seat 8 having a columnar space. As illustrated in FIG. 4, the second valve port 11 is formed in a peripheral surface of the valve seat 8 to have a square shape in projection view and an arcuate shape. An inner periphery of the outflow port 10 is set to, for example, Rc ¾ being a standard for a tapered female thread having a bore diameter of around 24 mm.

Examples of the fluid may include gases and liquids such as water, a corrosive liquid, and a chemical liquid. The fluids are used as, for example, a lower temperature fluid having a relatively lower temperature and a higher temperature fluid having a relatively higher temperature, which are used for temperature control. The lower temperature fluid and the higher temperature fluid have a relative relationship. The lower temperature fluid is not a fluid having an absolutely low temperature, and the higher temperature fluid is not a fluid having an absolutely high temperature. As the lower temperature fluid and the higher temperature fluid, for example, under air pressure of from 0 MPa to 1 MPa and within a temperature range of from about 0° C. to about 80° C., water (such as pure water) adjusted to a temperature of from about 0° C. to about 30° C. and water (pure water) adjusted to a temperature of from about 50° C. to about 80° C., are suitably used, respectively. Further, as the lower temperature fluid and the higher temperature fluid, for example, within a temperature range of from about −20° C. to about +80° C., there is used a fluid such a fluorine-based inert liquid, for example, Fluorinert (trademark) and ethylene glycol, which are neither frozen at a temperature of about −20° C. nor vaporized at a temperature of about +80° C.

As illustrated in FIG. 2 and FIG. 4, the valve main body 6 includes, in a center thereof, the valve seat 8 having a space faulted into a columnar shape extending along a vertical direction as described above. The valve seat 8 is formed in a state of penetrating an upper end surface of the valve main body 6. The first valve port 9 and the second valve port 11 formed in the valve main body 6 are arranged so as to be orthogonal to a center axis (rotation axis) C of the valve seat 8 having a columnar shape. More specifically, the first valve port 9 is formed in a bottom of the valve seat 8 having a columnar shape so that the first valve port 9 has a circular cross section when seen along the center axis C. Meanwhile, the second valve port 11 is formed in the peripheral surface of the valve seat 8 having a columnar shape so that the second valve port 11 is orthogonal to the center axis C.

Further, as illustrated in FIG. 1(*a*), the second valve port 11 is formed of an opening having a cross section formed into a rectangular shape, for example, a square shape. A length of one side of the second valve port 11 is set to be smaller than a diameter of the outflow port 10, and has a cross section formed into a rectangular shape substantially inscribed in the outflow port 10.

Figure 5:
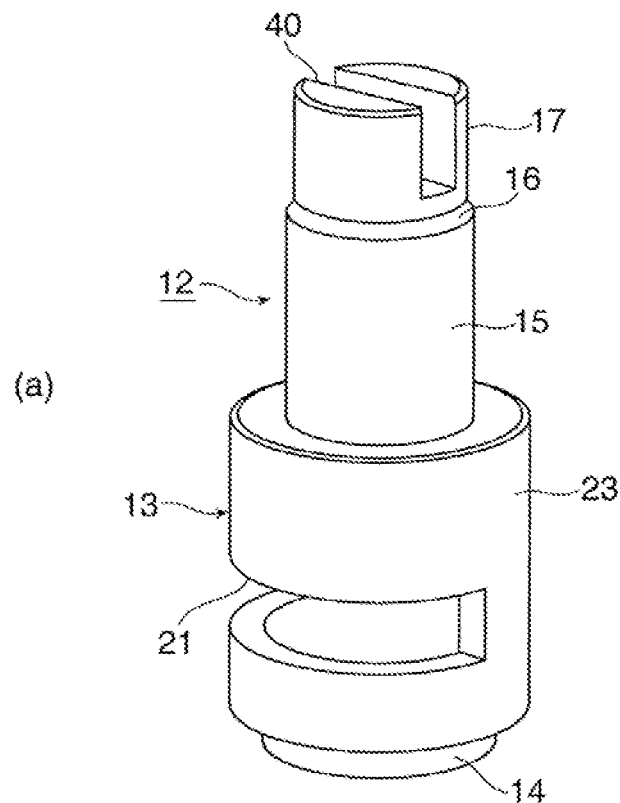
FIG. 5 are configuration views for illustrating a valve shaft.
Figure 5:
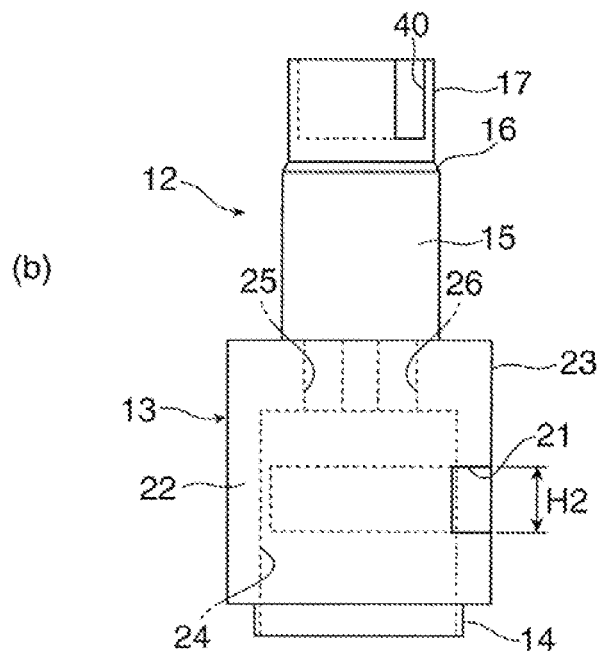

As illustrated in FIG. 5, a valve shaft 12 as one example of the valve element has an outer shape obtained by forming metal, for example, SUS, into a substantially columnar shape. The valve shaft 12 mainly includes a valve body portion 13, a shaft support portion 14, a sealing portion 15, and a coupling portion 17, which are integrally provided. The valve body portion 13 functions as a valve element. The shaft support portion 14 is provided at a lower end of the valve body portion 13, and supports the valve shaft 12 in a freely rotatable manner. The sealing portion 15 is provided to an upper portion of the valve body portion 13. The coupling portion 17 is provided to an upper portion of the sealing portion 15 through intermediation of a tapered portion 16.

The shaft support portion 14 is formed into a thin cylindrical shape so as to have an outer diameter smaller than that of the valve element portion 13. As illustrated in FIG. 2, the shaft support portion 14 is supported in a freely rotatable manner through intermediation of a bearing 18 by a lower end portion (bottom) of the valve seat 8 formed in the valve main body 6. The bearing 18 is made of polytetrafluoroethylene (PTFE) or the like. An annular support portion 19 configured to support the bearing 18 is formed at a lower portion of the valve seat 8 so as to protrude toward an inner periphery. As described above, the first valve port 9 is formed around an inner periphery of the support portion 19 to have a circular cross section. An inner diameter of the shaft support portion 14 is set to be smaller than an inner diameter of the bearing 18. With this configuration, substantially without flow resistance, the fluid having flowed through the inflow port 7 flows into the valve shaft 12 through the support portion 19 having a lower end surface formed into a tapered shape. A thrust washer 20 made of PTFE or the like is mounted to an upper end surface of the valve element portion 13, and is configured to reduce a load generated when the valve shaft 12 is pressed by a sealing case 28 to be described later.

Figure 6:
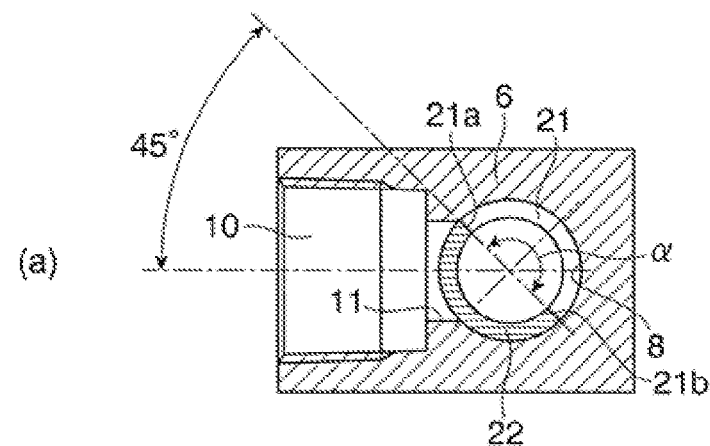
FIG. 6 are sectional configuration views for illustrating a valve actuating portion.
Figure 6:
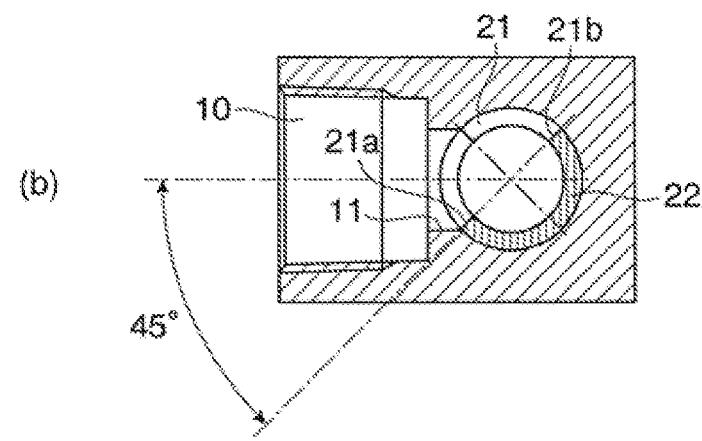
Figure 6:
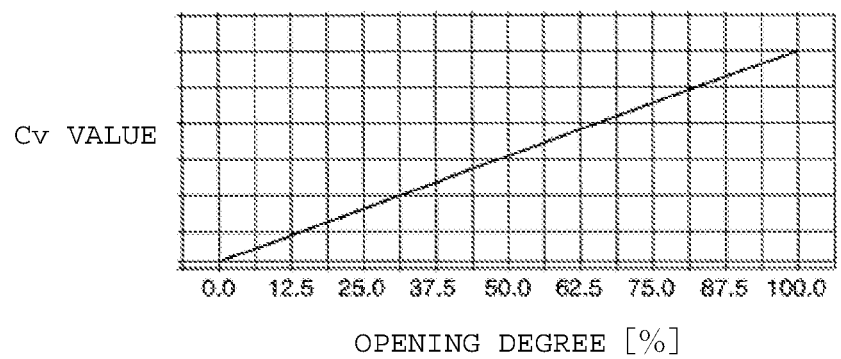

Further, as illustrated in FIG. 2 and FIG. 5(*b*), the valve body portion 13 is formed into a cylindrical shape having an opening portion 21 formed therein. The opening portion 21 has a half-cylindrical shape with an opening height H2, which is significantly smaller than an opening height H1 (see FIG. 3) of the second valve port 11. As illustrated in FIG. 6, a valve operating portion 22 having the opening portion 21 of the valve body portion is formed into a half-cylindrical shape (substantially half-cylindrical shape of a cylindrical portion excluding the opening portion 21) having a predetermined central angle α (for example, 180°). As illustrated in FIG. 2, the valve operating portion 22 is arranged in a freely rotatable manner in the valve seat 8, and is kept out of contact with an inner peripheral surface of the valve seat 8 with a minute clearance in order to prevent bite of metals. Accordingly, with the valve element portion 13 formed into a cylindrical shape and positioned above and below the opening portion 21 included, the valve operating portion 22 switches the second valve port 11 from a closed state to an opened state or from the opened state to the closed state. The opening portion 21 is positioned at a center of the second valve port 11 in an up-and-down direction. A valve shaft portion 23 arranged in an upper portion of the valve operating portion 22 is formed into a cylindrical shape to have the same outer diameter as that of the valve operating portion 22. The valve shaft portion 23 is kept out of contact with the inner peripheral surface of the valve seat 8 with a minute clearance in a freely rotatable manner. A columnar space 24 is formed in the valve operating portion 22 in a state of penetrating the valve operating portion 22 toward a lower end portion thereof. Further, two small holes 25 and 26 configured to allow torque measurement (inspection) to be performed on the valve shaft 12 are formed in a ceiling portion above the space 24 so as to be symmetrical with respect to the center line C.

As illustrated in FIG. 6, the second valve port 11 is formed to have a predetermined opening position and an opening dimension with respect to the inner peripheral surface of the valve seat 8. In contrast, the opening portion 21 of the valve operating portion 22 is set so as to form, for example, a central angle α of 180°. It is only necessary that the opening portion 21 of the valve operating portion 22 allow the second valve port 11 to be freely opened and closed between a fully closed state and a fully opened state. The central angle α of the opening portion 21 may be set to 90° in conformity with the second valve port 11. Further, the opening height H2 of the opening portion 21 of the valve operating portion 22 is one of parameters for determining a flow coefficient (Cv) of the two-way motor valve 1. In order to set the flow coefficient (Cv) to a large value, for example, the opening height of the opening portion 21 may be set to the height H1 equal to the height of the second valve port 11.

Further, a cross section of each of both end portions 21a and 21b of the valve operating portion 22 in a circumferential direction (rotation direction) of the opening portion 21, which is taken along a direction intersecting (orthogonal to) the center axis C, is formed into a flat-surface shape. The both end portions 21a and 21b of the opening portion 21 are arranged along a radial direction of the valve shaft 12. The cross section of each of the both end portions 21a and 21b of the valve operating portion 22 in the circumferential direction of the opening portion 21, which is taken along the direction intersecting the rotation axis C, is not limited to a flat-surface shape. The cross section of each of the both end portions 21a and 21b may be formed into a curved-surface shape such as an arc shape.

As illustrated in FIG. 6, when the valve shaft 12 is driven to rotate to open and close the second valve port 11, in flows of the fluid, the both end portions 21a and 21b of the valve operating part 22 in the circumferential direction of the opening portion 21 are moved (rotated) so as to protrude from or retreat to the ends of the second valve port 11 in the circumferential direction. Accordingly, the second valve port 11 is switched from the opened state to the closed state, or from the closed state to the opened state. At this time, the both end surfaces 21a and 21b (mainly the end surface 21a) of the valve operating portion 22 in the circumferential direction of the opening portion 21 linearly change an opening area of the second valve port 11 with respect to a rotation angle of the valve shaft 12.

As illustrated in FIG. 2 and FIG. 4, the sealing portion 4 is configured to seal the valve shaft 12 in a liquid-tight state. The sealing portion 4 has the sealing case 28 obtained by forming metal, for example, SUS, into a cylindrical shape. The sealing case 28 has an insertion through hole 27 through which the valve shaft 12 is inserted. The sealing case 28 is inserted and fixed in a concave portion 29, which is provided to an upper end surface of the valve main body 6 and has a columnar shape, under a state in which a sealing agent is applied to the sealing case 28, or is mounted to the valve main body 6 in a sealed state through means such as screw fastening to the concave portion 29 with a male thread portion (not shown) provided to an outer periphery of the sealing case 28. A space between the sealing case 28 and the valve main body 6 is sealed by an O-ring 30 made of ethylene propylene rubber (EPDM). In an inner peripheral surface of the sealing case 28, two annular sealing members 31 and 32 configured to seal the valve shaft 12 are arranged in a vertical direction. As the sealing member 31, for example, there is used an X-ring or an O-ring made of hydrogenated acrylonitrile-butadiene rubber (H-NBR), which is excellent in heat resistance, oil resistance, and weather resistance. Further, as the sealing member 32, for example, an O-ring made of EPDM is used. The sealing member 32 is fixed to the sealing case 28 by a bush 33. As illustrated in FIG. 3(b), the sealing case 28 is positioned by a parallel pin 34 and mounted to a concave portion of an adaptor plate 36 to be described later.

As illustrated in FIG. 2, the coupling portion 5 is arranged between the valve main body 6, in which the sealing portion 4 is provided, and the actuator 3. The coupling portion 5 is configured to connect the valve shaft 12 and a rotation shaft 35, which allows the valve shaft 12 to be integrally rotated, to each other. The coupling portion 5 includes the adaptor plate 36 and a coupling member 38. The adaptor plate 36 is arranged between the sealing portion 4 and the actuator 3. The coupling member 38 is accommodated in an insertion through hole 37 having a columnar shape formed in a state of penetrating an inside of the adaptor plate 36, and couples the valve shaft 12 and the rotation shaft 35 to each other. As illustrated in FIG. 3(a), the adaptor plate 36 is obtained by forming metal, for example, an AL alloy or SUS into such a thick plate-like shape that a front side (lower side in FIG. 3(a)) has a semicircular shape and a back side (upper side in FIG. 3(a)) has a trapezoid shape in plan view. The adaptor plate 36 is mounted in a fixed state to the valve main body 6 with four hexagonal socket head cap screws 39.

As illustrated in FIG. 2, the coupling member 38 is obtained by forming metal, for example, SUS into a cylindrical shape. A concave groove 40 (see FIG. 4) is formed so as to penetrate an upper end of the valve shaft 12 in a horizontal direction. The valve shaft 12 is coupled and fixed to the coupling member 38 through the concave groove 40 with a connecting pin 41 provided so as to penetrate the coupling member 38 in a direction orthogonal to the center axis C. Meanwhile, a lower end portion of the rotation shaft 35 is coupled and fixed to the coupling member 38 with a connecting pin 42 provided so as to penetrate the coupling member 38 and the rotation shaft 35. The adaptor plate 36 has an opening portion 43 formed in a side surface thereof for detecting leakage of a liquid through the insertion through hole 37 when the liquid leaks through the sealing members 31 and 32. The opening portion 43 is set to, for example, Rc ⅛ being a standard for a tapered female thread having a bore diameter of around 10 mm.

In FIG. 1, a reference symbol 44 denotes a power source and alarm-side cable, and a reference symbol 45 denotes an analog-side cable. The power source and alarm-side cable 44 and the analog-side cable 45 are connected to a control device 84 configured to control the two-way motor valve 1, which is described later.

As illustrated in FIG. 2, the actuator 3 includes a casing 46 and a lid body 47. The casing 46 is formed into a box shape having a rectangular shape in plan view, a relatively small height, and an opening formed in an entire upper end surface thereof. The lid body 47 is formed into a box shape having a rectangular shape in plan view, a relatively large height, and an opening that is formed in a lower end surface thereof into the same shape as that of the opening of the casing 46. The casing 46 of the actuator 3 is made of metal, for example, SUS. As illustrated in FIG. 3, the casing 46 is mounted in a fixed state to the adaptor plate 36 of the coupling portion 5 with two hexagonal socket head cap screws 48. A lower end portion of the rotation shaft 35 is held in a freely rotatable manner in the casing 46 of the actuator 3 through intermediation of a bearing portion 51 and a bearing member 52 provided integrally with a bottom wall 50 of the casing 46. The rotation shaft 35 is arranged so as to be orthogonal to a bottom surface 54 of the casing 46 that serves as a reference surface when the casing 46 is mounted to the valve main body 6 through intermediation of the adaptor plate 36.

A first mounting board 53 is provided in the casing 46 of the actuator 3 so as to be positioned in an opening portion of an upper end of the casing 46. A surface of the first mounting board 53 forms a reference surface. Instead of forming the reference surface by the surface of the first mounting board 53, the reference surface may be formed by a flange portion or the like formed at an inner periphery of the opening portion of the casing 46. The first mounting board 53 is fixed to the bottom wall 50 of the casing 46 or the flange portion (not shown) formed on the opening portion of the casing 46 through means such as screw fastening (not shown). Further, the first mounting board 53 is arranged in parallel to the external bottom surface 54 of the casing 46. The rotation shaft 35 is supported in a freely rotatable manner in the first mounting board 53 through intermediation of a bearing member 55. As a result, the first mounting board 53 is arranged so as to be orthogonal to the rotation shaft 35. The rotation shaft 35 includes a flange portion 56 that is formed at a middle position of the rotation shaft 35 in an axial direction of the rotation shaft 35 to have a slightly large outer diameter. The flange portion 56 is held in contact with a lower end surface of the bearing member 55.

Figure 7:
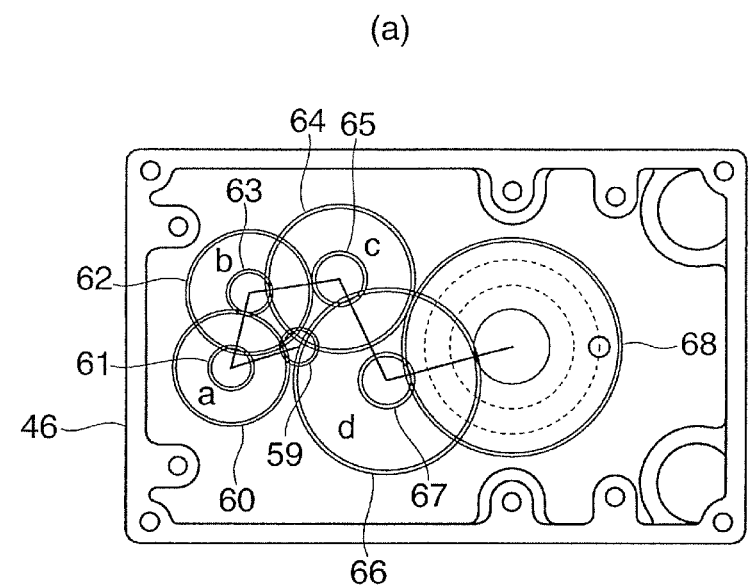
FIG. 7 are configuration views for illustrating an actuator.
Figure 7:
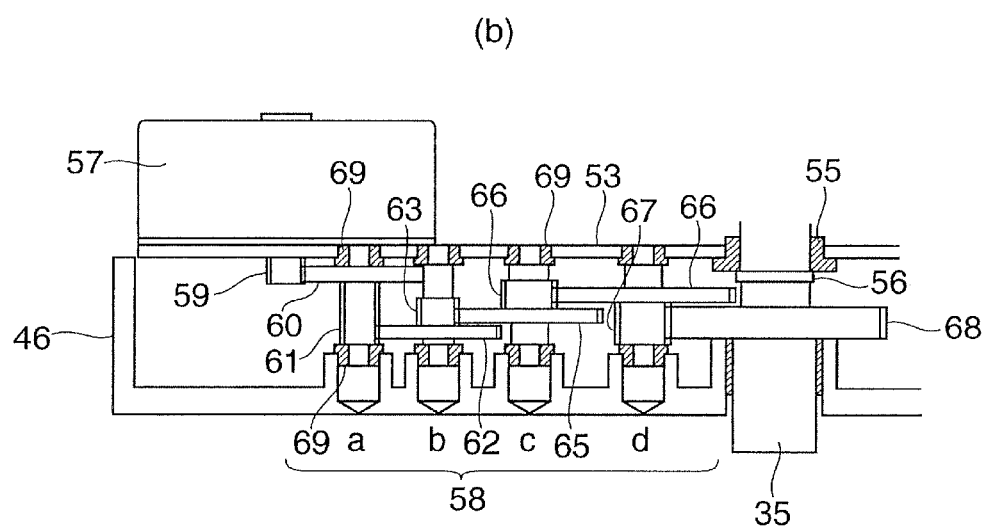

A drive motor 57, which is one example of drive means configured to rotate and drive the rotation shaft 35, is mounted to the first mounting board 53. It is preferred that a stepping motor be used as the drive motor 57. Further, a reduction gear device 58 is arranged between the bottom wall 50 of the casing 46 and the first mounting board 53. The reduction gear device 58 reduces speed of the drive motor 57 and increases torque so as to transmit a rotational driving force of the drive motor 57 to the rotation shaft 35. As illustrated in FIG. 7, the reduction gear device 58 includes an output gear 59, a first reduction gear 60, a second reduction gear 61, a third reduction gear 62, a fourth reduction gear 63, a fifth reduction gear 64, a sixth reduction gear 65, a seventh reduction gear 66, an eighth reduction gear 67, and a drive gear 68. The output gear 59 is fixed to an output shaft of the drive motor 57. The first reduction gear 60 meshes with the output gear 59. The second reduction gear 61 is provided coaxially with the first reduction gear 60. The third reduction gear 62 meshes with the second reduction gear 61 and has a large diameter. The fourth reduction gear 63 is provided coaxially with the third reduction gear 62 and has a small diameter. The fifth reduction gear 64 meshes with the fourth reduction gear 63 and has a large diameter. The sixth reduction gear 65 is provided coaxially with the fifth reduction gear 64 and has a small diameter. The seventh reduction gear 66 meshes with the sixth reduction gear 65 and has a large diameter. The eighth reduction gear 67 is provided coaxially with the seventh reduction gear 66 and has a small diameter. The drive gear 68, which meshes with the eighth reduction gear 67 and is mounted to the rotation shaft 35. The reduction gear device 58 rotates and drives the rotation shaft 35 at a predetermined reduction ratio (about 1/600) to rotation of the drive motor 57. Rotation shafts of the first reduction gear 60 to the eighth reduction gear 67 are supported in a freely rotatable manner on the bottom wall 50 of the casing 46 and the first mounting board 53 through intermediation of bearing members 69. In FIG. 7(b), meshing among the first reduction gear 60 to the eighth reduction gear 67 is illustrated in a developed manner by reference symbols "a" to "d" in alphabetical order that corresponds to a direction of transmitting the driving force.

Figure 8:
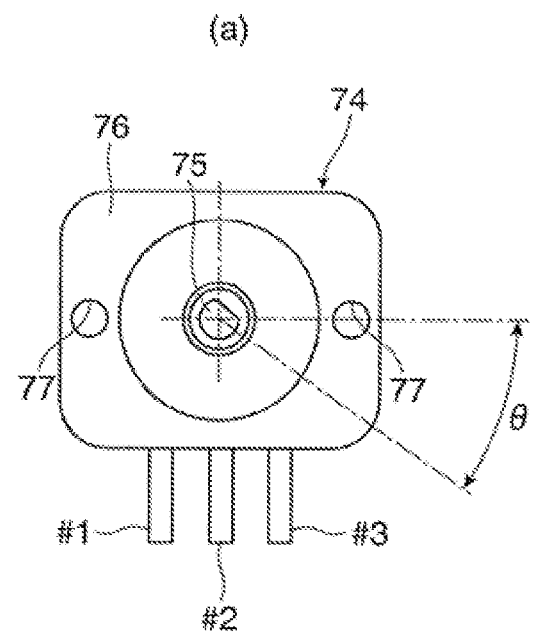
FIG. 8 are configuration views for illustrating an angle sensor.
Figure 8:
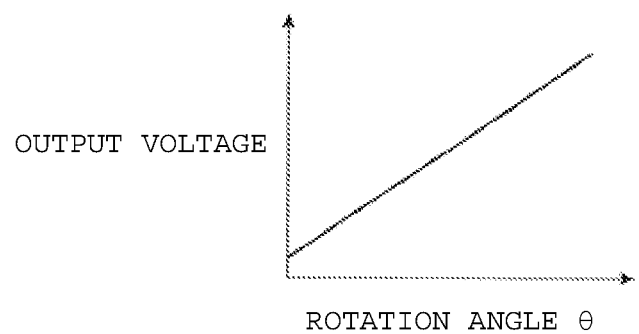

As illustrated in FIG. 2, a second mounting board 73 is provided above the first mounting board 53 through intermediation of a pair of column blocks 71 and 72 as one example of a column member so as to be parallel to the first mounting board 53. An angle sensor 74 is mounted to the second mounting board 73. The angle sensor 74 is one example of angle detection means configured to detect a rotation angle of the rotation shaft 35. As illustrated in FIG. 8(a), the angle sensor 74 includes an operating portion 75 that is formed at a center thereof and has a circular shape in plan view. An upper end portion of the rotation shaft 35 is directly connected to the operating portion 75. The upper end portion of the rotation shaft 35 having a D-cut part or double D-cut part is inserted into the operating portion 75 of the angle sensor 74 so that direct connection is established. The angle sensor 74 may be of a noncontact type. The term "direct connection" in this embodiment encompasses a case in which the upper end portion of the rotation shaft 35 is inserted into the operating portion 75 of the angle sensor 74 in a noncontact state (the upper end portion of the rotation shaft 35 is normally kept out of contact with the angle sensor 74 because the angle sensor may be deformed). The angle sensor 74 includes three terminals #1, #2, and #3. As shown in FIG. 8(b), through application of a predetermined voltage between the first terminal #1 and the third terminal #3, an output voltage output from the second terminal #2 linearly changes in accordance with the rotation angle of the rotation shaft 35, thereby detecting a rotation angle θ of the rotation shaft 35.

As illustrated in FIG. 8(a), through means such as screw fastening, amounting surface 76 of the angle sensor 74, which serves as a reference surface, is fixed to the second board 73 through mounting holes 77 so as to be held in contact with the surface of the second board 73. As the angle sensor 74, there is used a sensor having such detection accuracy as to allow, for example, a margin of error of from about 10 hundredths to 60 hundredths of one degree (0.1° to 0.6°), but the angle sensor 74 is not limited thereto. Various types can be used as the angle sensor 74.

Figure 9:
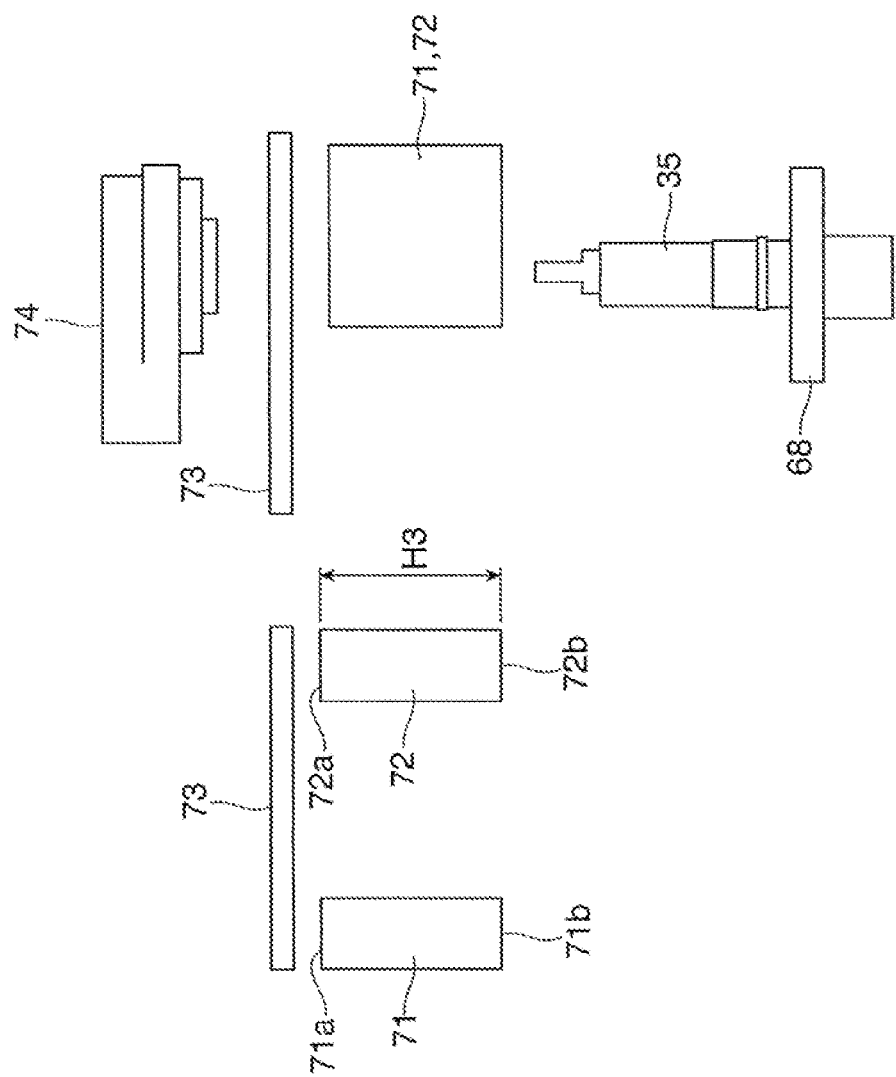
FIG. 9 is an exploded configuration view for illustrating the mounting structure for a rotation shaft and the angle sensor.
Figure 10:
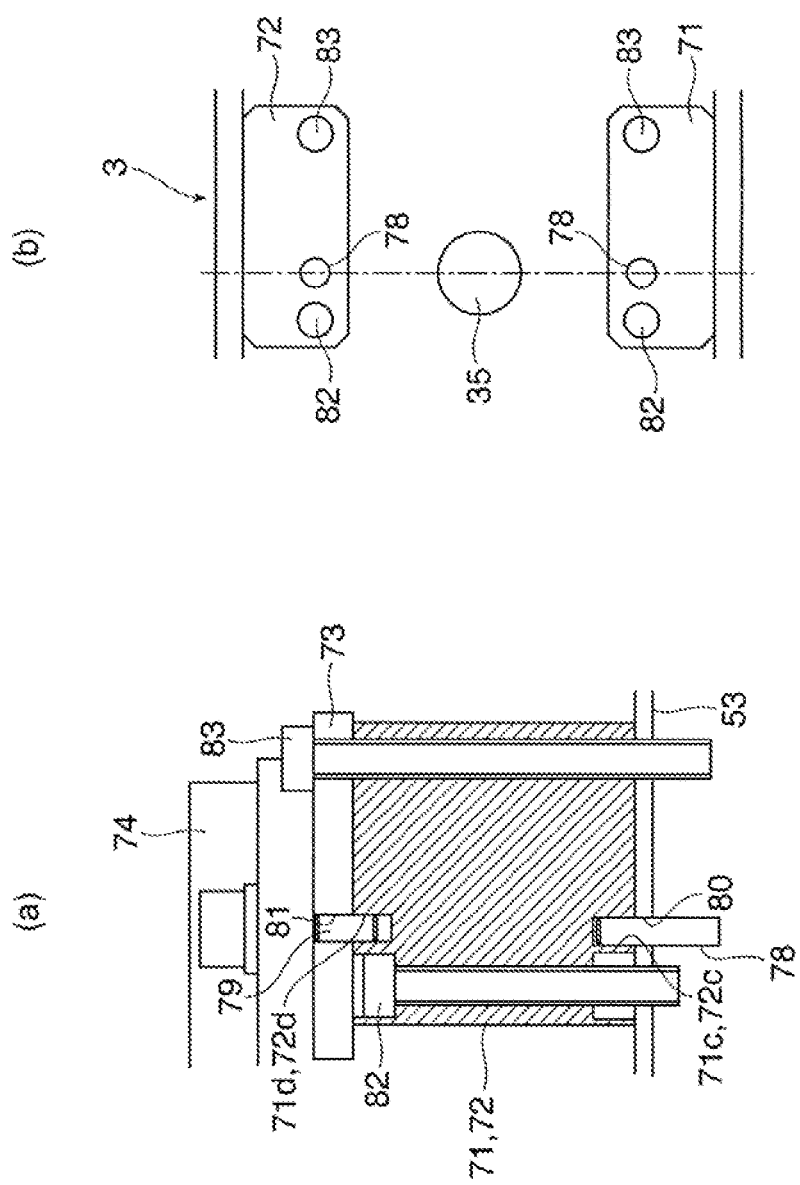
FIG. 10 are configuration views for illustrating the mounting structure for the rotation shaft and the angle sensor.

As illustrated in FIG. 9, the pair of column blocks 71 and 72 are made of metal such as SUS, and have the same height H3. Further, the column block 71 is formed of a rectangular parallelepiped member having an upper end surface 71a and a lower end surface 71b parallel to each other, and the column block 72 is formed of a rectangular parallelepiped member having an upper end surface 72a and a lower end surface 72b parallel to each other. As illustrated in FIG. 10, insertion holes 71c, 72c, 71d, and 72d are formed in the lower end surface 71b, the lower end surface 72b, the upper end surface 71a, and the upper end surface 72a of the pair of column blocks 71 and 72, respectively, and insertion holes 80 and insertion holes 81 are formed in the first mounting board 53 and the second mounting board 73, respectively. The insertion holes 71c, 72c, 71d, 72d, 80, and 81, into which positioning pins 78 and 79 are inserted, are formed at positions equally distant from the rotation shaft 35 so as to be parallel to the rotation shaft 35. The first mounting board 53 is positioned by the positioning pins 78 inserted into the insertion holes 71c, 72c, and 80, and the second mounting board 73 is positioned by the positioning pins 79 inserted into the insertion holes 71d, 72d, and 81. Thus, the first mounting board 53 and the second mounting board 73 are arranged in parallel to each other. Further, each of the pair of column blocks 71 and 72 is fixed to the first mounting board 53 with a first mounting screw 82 that is embedded in each of the column blocks 71 and 72 and has a large length. Further, each of the pair of column blocks 71 and 72 is fixed to both the first mounting board 53 and the second mounting board 73 with a second mounting screw 83 that is inserted through each of the column blocks 71 and 72 and has a large length.

In addition, as illustrated in FIG. 2, a control board 84 configured to control the two-way motor valve 1 is provided above the second mounting board 73. The control board 84 is mounted to the second mounting board 73 with screws 85 and 86 and the like through intermediation of a plurality of support pipes 87 and 88 and the like that extend upright.

Figure 11:
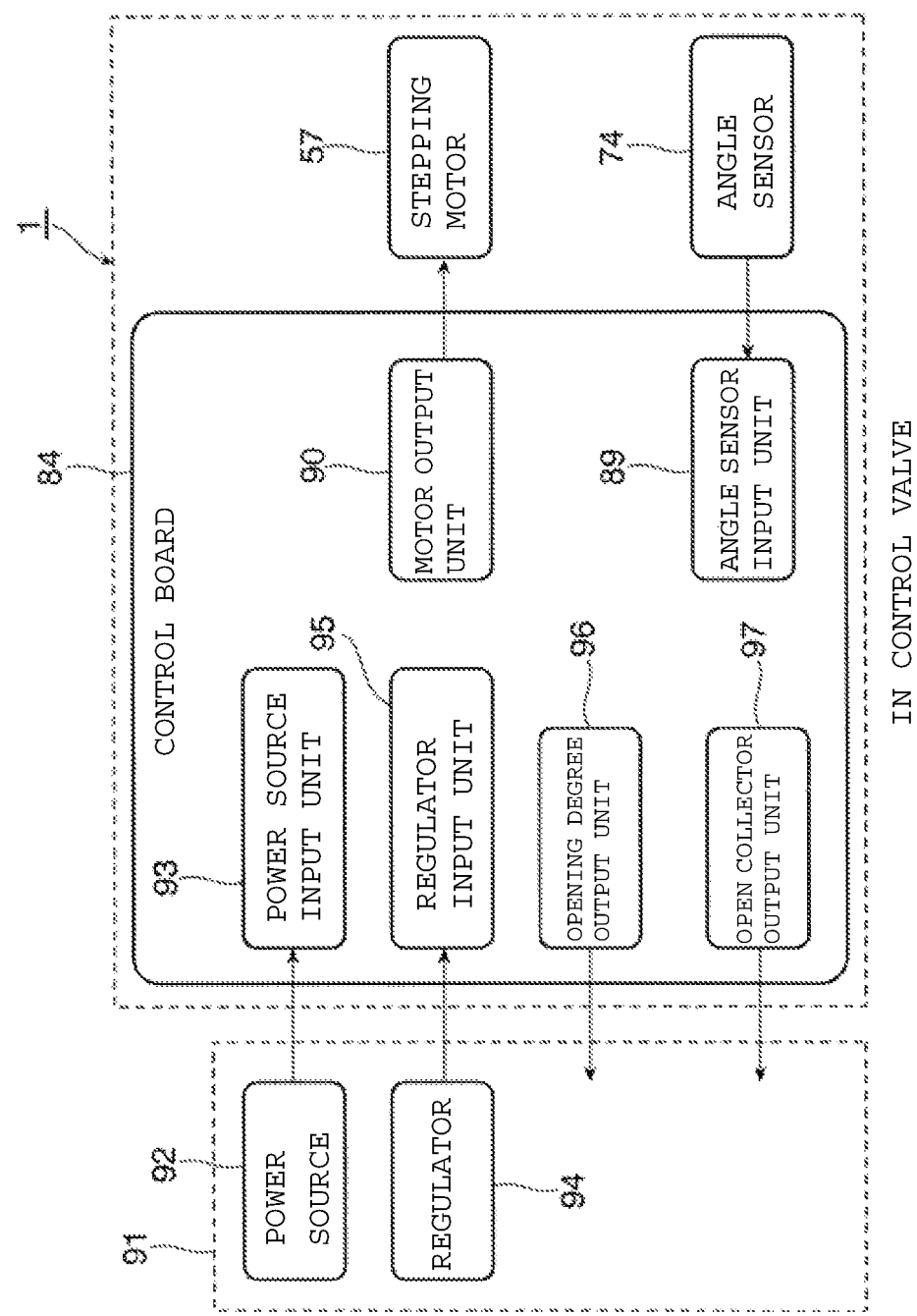
FIG. 11 is a block diagram for illustrating a control circuit for a flow rate control valve in the first embodiment of the present invention.

FIG. 11 is a block diagram for illustrating the control board.

As illustrated in FIG. 11, the control board 84 includes an angle sensor input unit 89, a motor output unit 90, a power source input unit 93, a regulator input unit 95, an opening degree output unit 96, and an open collector output unit 97. The angle sensor input unit 89 receives a detection signal input from the angle sensor 74. The motor output unit 90 is configured to drive the drive motor 57. The power source input unit 93 receives desired electric power supplied from a power source 92 of an external device 91 operated by a user who uses the two-way motor valve 1. The regulator input unit 95 receives a reference electric current or the like input from a regulator 94 of the external device 91. The opening degree output unit 96 is configured to output an opening degree output current in accordance with an opening degree of the two-way motor valve 1. The open collector output unit 97 is configured to output a signal indicating whether or not the two-way motor valve 1 is in a normal condition. Further, the angle sensor input unit 89 includes an A/D converter (not shown) configured to convert, into a digital signal, an output voltage output from the angle sensor 74.

Figure 12:
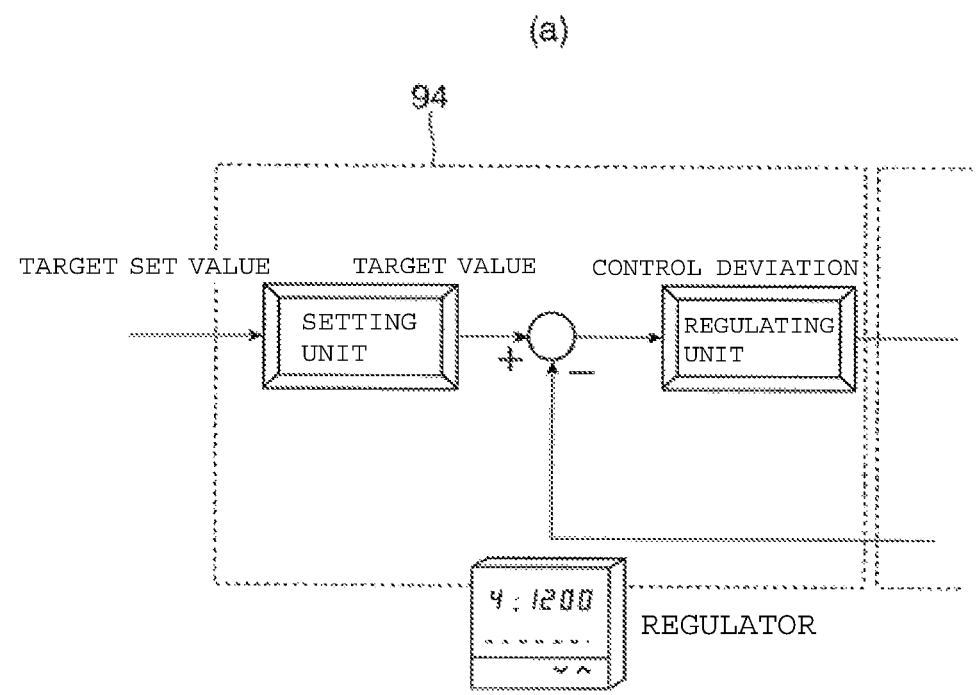
FIG. 12 are block diagrams for illustrating the control circuit for the flow rate control valve in the first embodiment of the present invention.
Figure 12:
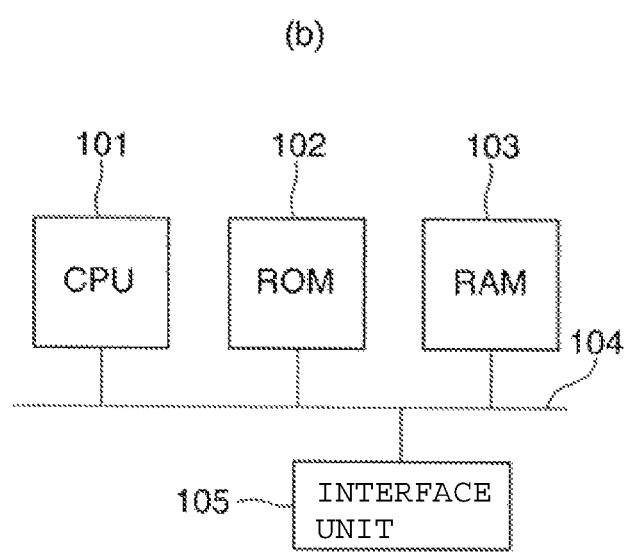

Further, as illustrated in FIG. 12, the control board 84 includes a central processing unit (CPU) 101, a read only memory (ROM) 102, a random access memory (RAM) 103, a bus 104, and an interface unit 105. The CPU 101 serves as control means configured to execute a setting mode and an operating mode based on instructions from the regulator 94 of the external device 91 as described later. The ROM 102 stores in advance programs for the setting mode and the operating mode to be executed by the CPU 101. The RAM 103 stores a parameter and the like executed by the CPU 101. The bus 104 is configured to connect the CPU 101, the ROM 102, and the like to one another. The interface unit 105 is configured to connect the CPU 101 to the angle sensor input unit 89, the motor output unit 90, the regulator input unit 95, the opening degree output unit 96, and the open collector output unit 97 through a switching circuit or the like (not shown). The CPU 101 is controlled by a controller (not shown).

Operation of Two-Way Motor Valve

In the two-way motor valve 1 according to this embodiment, the flow rate of the fluid is controlled as follows.

As illustrated in FIG. 6(a), during assembly, a mechanical adjustment operation is performed on the two-way motor valve 1 so that the opening area of the second valve port 11 of the valve portion 2 is as small as possible. Specifically, before electric power is supplied to the two-way motor valve 1 from the power source 92 of the external device 91 through the power source input unit 93, as illustrated in FIG. 2, the adjustment operation is performed so that the valve shaft 12 of the valve portion 2 is located at a fully closing position of closing the second valve port 11. As illustrated in FIG. 2, the adjustment operation is performed in such a manner that under a state in which a position of the connecting pin 41 is fixed by a jig, the valve shaft 12 is located at the position of closing the second valve port 11 by combining the valve portion 2 with the valve shaft 12. At this time, as shown in FIG. 6(c), the fully closing position of the valve shaft 12 corresponds to a position at which a flow rate of the fluid is minimum, and corresponds to a position at which the flow rate of the fluid starts to increase when the valve shaft 12 starts to rotate in a predetermined direction (opening direction). Thus, alignment with good accuracy is required.

Figure 13:
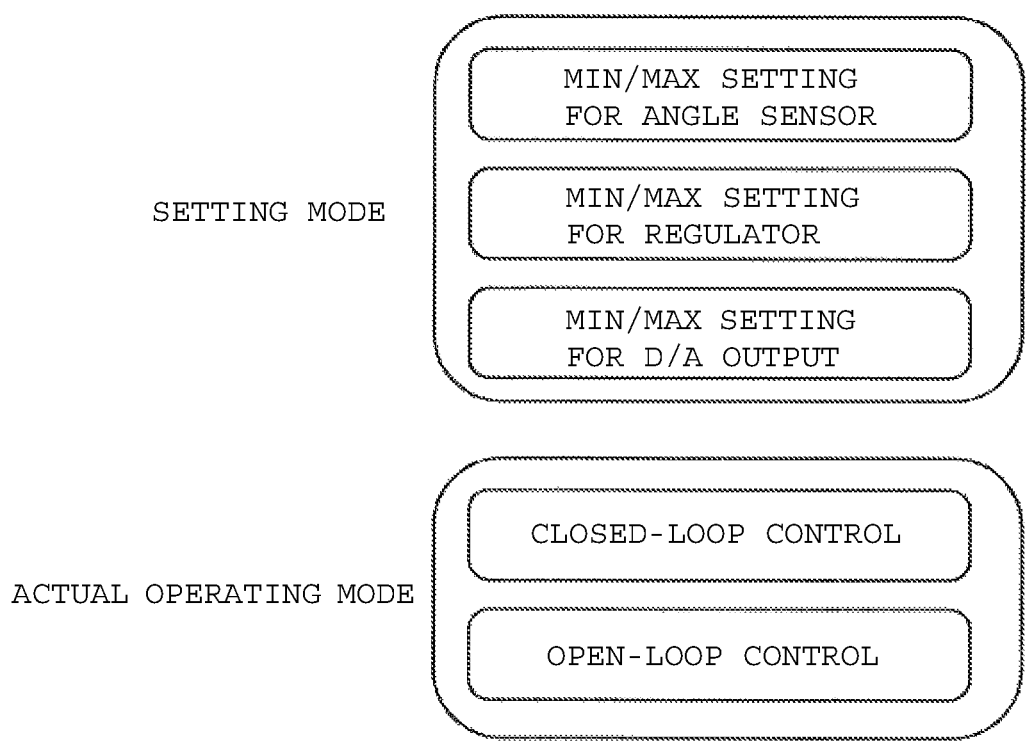
FIG. 13 is an explanatory diagram for illustrating operations of the flow rate control valve in the first embodiment of the present invention.

Next, as illustrated in FIG. 13, in the two-way motor valve 1, after the setting mode is executed and various values are stored in the RAM 103, the motor valve 1 for flow rate control executes the actual operating mode for controlling the flow rate of the fluid. The setting mode contains min/max setting for the angle sensor 74, min/max setting for the regulator 94, and min/max setting for a D/A output. Further, the actual operating mode contains any one of closed-loop control and open-loop control.

Figure 14:
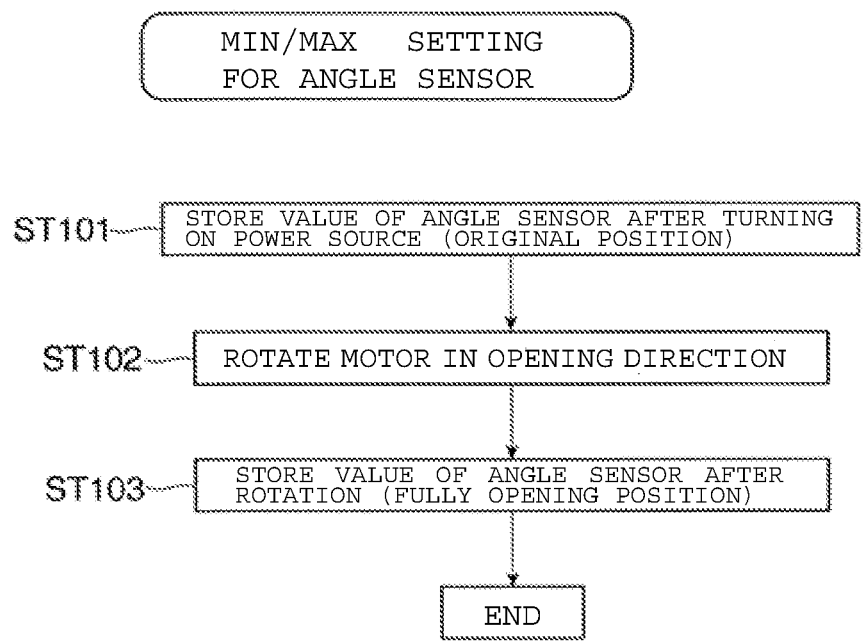
FIG. 14 is a flow chart for illustrating the operations of the flow rate control valve in the first embodiment of the present invention.

As illustrated in FIG. 14, in the min/max setting for the angle sensor 74, the CPU 101 reads, through the angle sensor input unit 89, a value of the output voltage of the angle sensor 74 immediately after turning on the power source of the control board 84, and then the read value (digital value) of the output voltage corresponding to an original position of the angle sensor 74 is stored in the RAM 103 (Step 101). Next, the CPU 101 outputs a drive pulse of a predetermined value from the motor output unit 90 to the drive motor 57, to thereby rotate and drive the rotation shaft 35 through the reduction gear device 58. After that, the CPU 101 reads a value of the output voltage of the angle sensor 74 after rotation, and the read value of the output voltage is stored in the RAM 103 as a value corresponding to a fully opening position (Step 103). Then, the min/max setting operation for the angle sensor is terminated.

Figure 15:
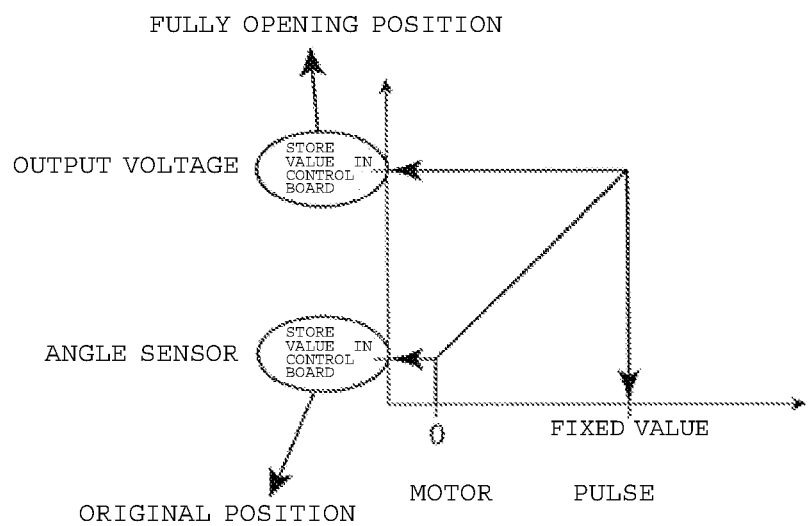
FIG. 15 is a graph for showing the operations of the flow rate control valve in the first embodiment of the present invention.

As described above, the min/max setting operation for the angle sensor 74 is performed to correct the two-way motor valve 1. Through the min/max setting operation for the angle sensor 74, as shown in FIG. 15, the valve shaft 12 is at the fully closing position (original position) when an output pulse to the drive motor 57 is zero, and the output value of the angle sensor 74 corresponding to the original position is stored. The valve shaft 12 is at the fully opening position when the output pulse to the drive motor 57 has the fixed predetermined value (maximum value), and the output value of the angle sensor 74 corresponding to the fully opening position is stored. Thus, even when there are errors in a position of the valve shaft 12 of the two-way motor valve 1 and in amounting position of the angle sensor 74, as shown in FIG. 8(b), a one-to-one correspondence is always established between the output value of the angle sensor 74 given when the output pulse to the drive motor 57 is zero, and the output value of the angle sensor 74 given when the output pulse to the drive motor 57 has the maximum value. Accordingly, the rotation angle of the rotation shaft 35 mounted integrally with the valve shaft 12 can be detected with good accuracy.

Figure 16:
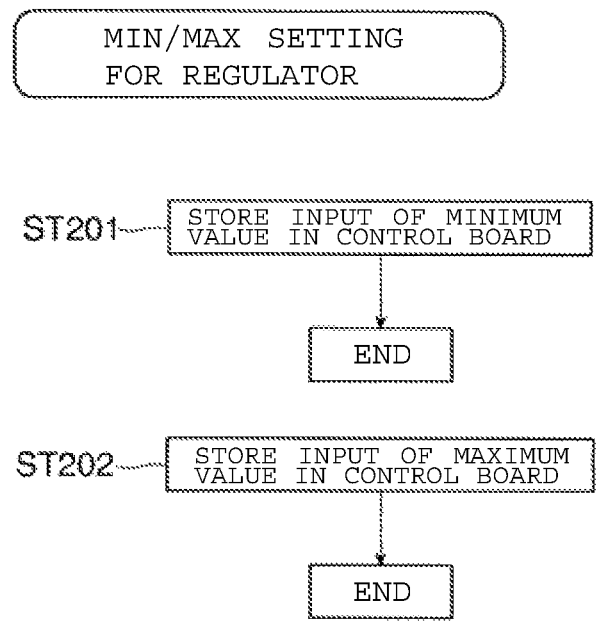
FIG. 16 is a flow chart for illustrating the operations of the flow rate control valve in the first embodiment of the present invention.
Figure 17:
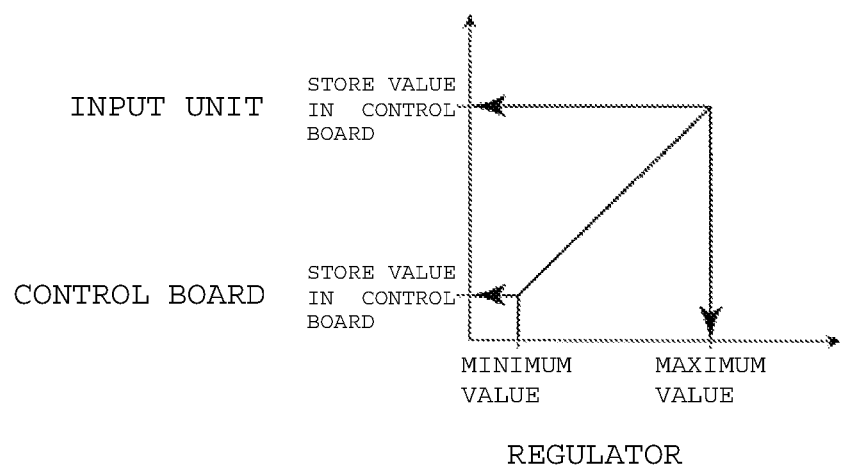
FIG. 17 is a graph for showing the operations of the flow rate control valve in the first embodiment of the present invention.

In the min/max setting for the regulator 94, as illustrated in FIG. 16, a preset minimum value of an input current is input from the regulator 94 of the external device 91 to the control board 84 through the regulator input unit 95, and the CPU 101 stores the value of the input current in the RAM 103 (Step 201). Next, a preset maximum value of an input current is input from the regulator 94 of the external device 91 to the control board 84 through the regulator input unit 95, and the CPU 101 stores the value of the input current in the RAM 103 (Step 202). As shown in FIG. 17, the min/max setting for the regulator 94 is an operation performed so as to conform the input currents input from the regulator 94 of the external device 91 to the fully closing position and the fully opening position of the valve shaft 12. That is, correction is performed so that the valve shaft 12 is at the fully closing position when the input current input from the regulator 94 of the external device 91 has the minimum value, and that the valve shaft 12 is at the fully opening position when the input current input from the regulator 94 of the external device 91 has the maximum value.

Figure 18:
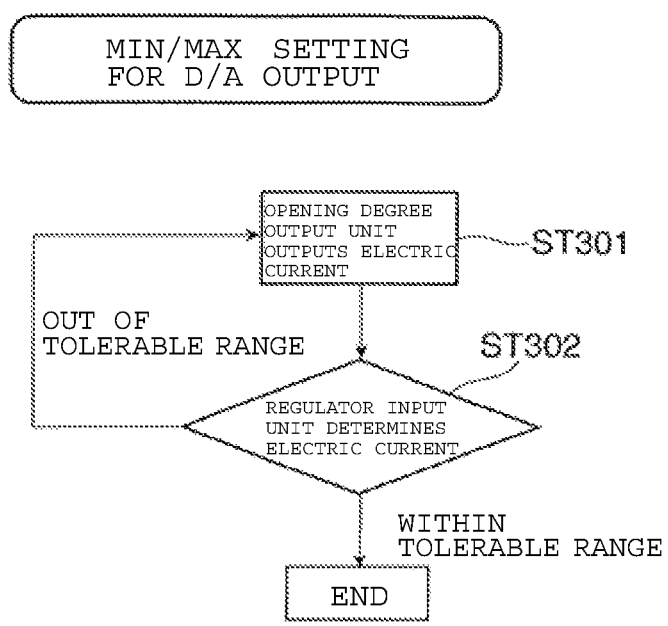
FIG. 18 is a flow chart for illustrating the operations of the flow rate control valve in the first embodiment of the present invention.
Figure 19:
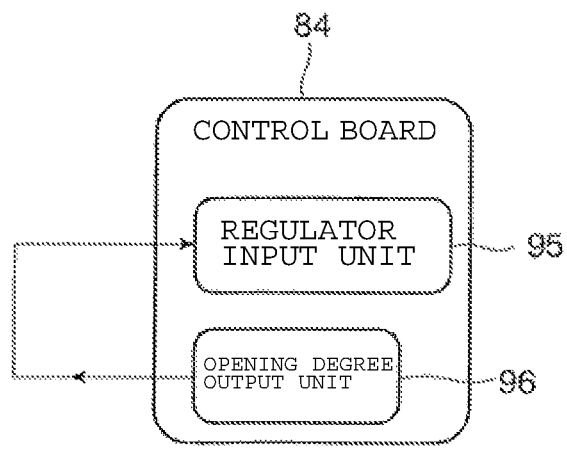
FIG. 19 is a configuration diagram for illustrating the operations of the flow rate control valve in the first embodiment of the present invention.

As illustrated in FIG. 18 and FIG. 19, in the min/max setting for the D/A output, an output current from the opening degree output unit 96 of the control board 84 is input directly to the regulator input unit 95, and setting is performed so as to equalize the output current from the opening degree output unit 96 of the control board 84 to an input current set in the regulator input unit 95. In accordance with the output voltage from the angle sensor 74, which is input to the angle sensor input unit 89, the opening degree output unit 96 of the control board 84 outputs, to the external device 91, the output current corresponding to the opening degree (rotation angle) of the valve shaft 12. A value of the output current is used when feedback control or the like is executed in the external device 91.

As illustrated in FIG. 18, the CPU 101 outputs a predetermined output current from the opening degree output unit 96 (Step 301), and determines whether or not the output current input from the opening degree output unit 96 to the regulator input unit 95 is equal to each of the preset minimum value and the preset maximum value (Step 302). The CPU 101 repeats an operation of adjusting the output current from the opening degree output unit 96 until a difference between the output current from the opening degree output unit 96 and each of the minimum value and the maximum value input to the regulator input unit 95 and stored in the ROM 103 attains a level within a tolerable range. At a point in time when the output current from the opening degree output unit 96 is equal to each of the minimum value and the maximum value (or an error attains a level within the tolerable range), the min/max setting operation for the D/A output is terminated. When the min/max setting for the D/A output is performed in combination with the above-mentioned min/max setting for the regulator 94, a one-to-one correspondence can be always established with good accuracy between the input current input from the regulator 94 of the external device 91, and the predetermined output current from the opening degree output unit 96 corresponding to the output voltage from the angle sensor 74 in a case of driving the drive motor 57 in accordance with the input current.

After that, in the two-way motor valve 1, as illustrated in FIG. 13, the actual operating mode is executed. In the actual operating mode, any one of the open-loop control and the closed-loop control is executed.

Figure 20:
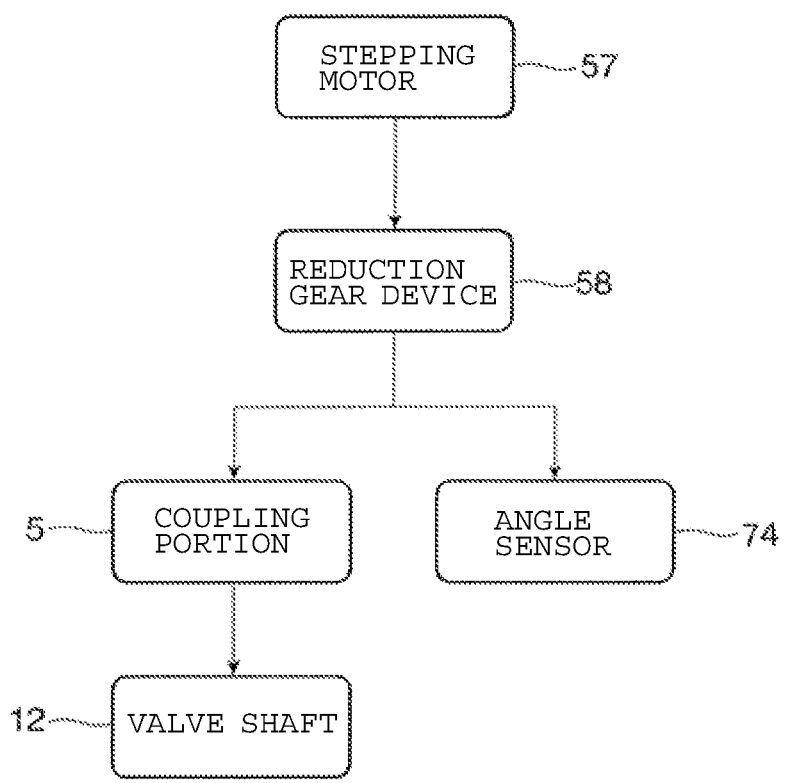
FIG. 20 is a configuration diagram for illustrating the operations of the flow rate control valve in the first embodiment of the present invention.
Figure 21:
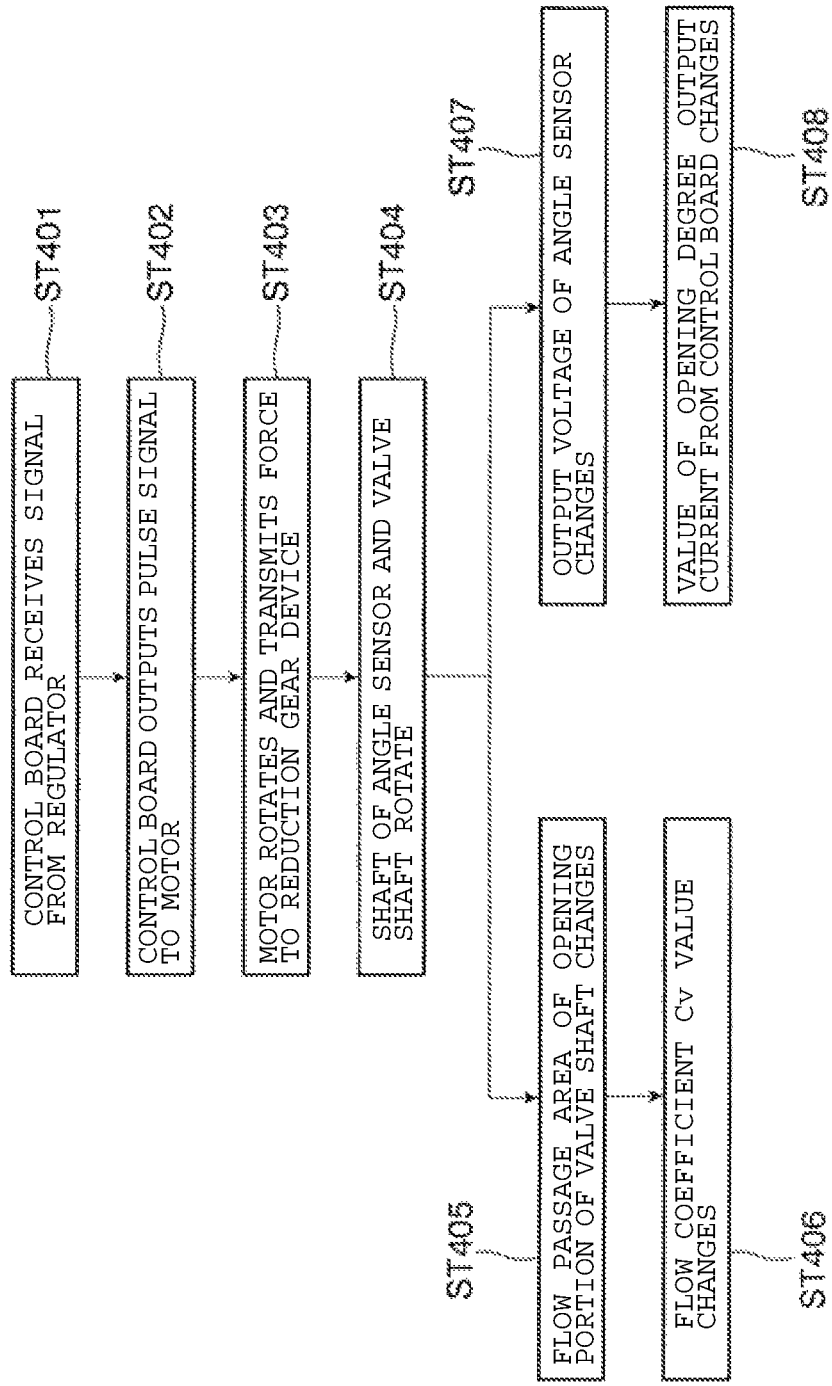
FIG. 21 is a flow chart for illustrating the operations of the flow rate control valve in the first embodiment of the present invention.

In any of the open-loop control and the closed-loop control, as illustrated in FIG. 20, in the two-way motor valve 1, the valve shaft 12 is driven by the stepping motor 57 through the reduction gear device 58 and the coupling portion 5, and the rotation angle of the rotation shaft 35 is detected by the angle sensor 74. Further, in the two-way motor valve 1, as illustrated in FIG. 21, the control board 84 receives a signal from the regulator 94 (Step 401), and a drive pulse signal is output from the control board 84 to the drive motor 57 through the motor output unit 90 (Step 402). Along with this operation, the drive motor 57 is rotated, and the driving force is transmitted to the reduction gear device 58 (Step 403). Further, the rotation shaft 35 of the angle sensor 74 and the valve shaft 12 are rotated (Step 404).

Figure 22:
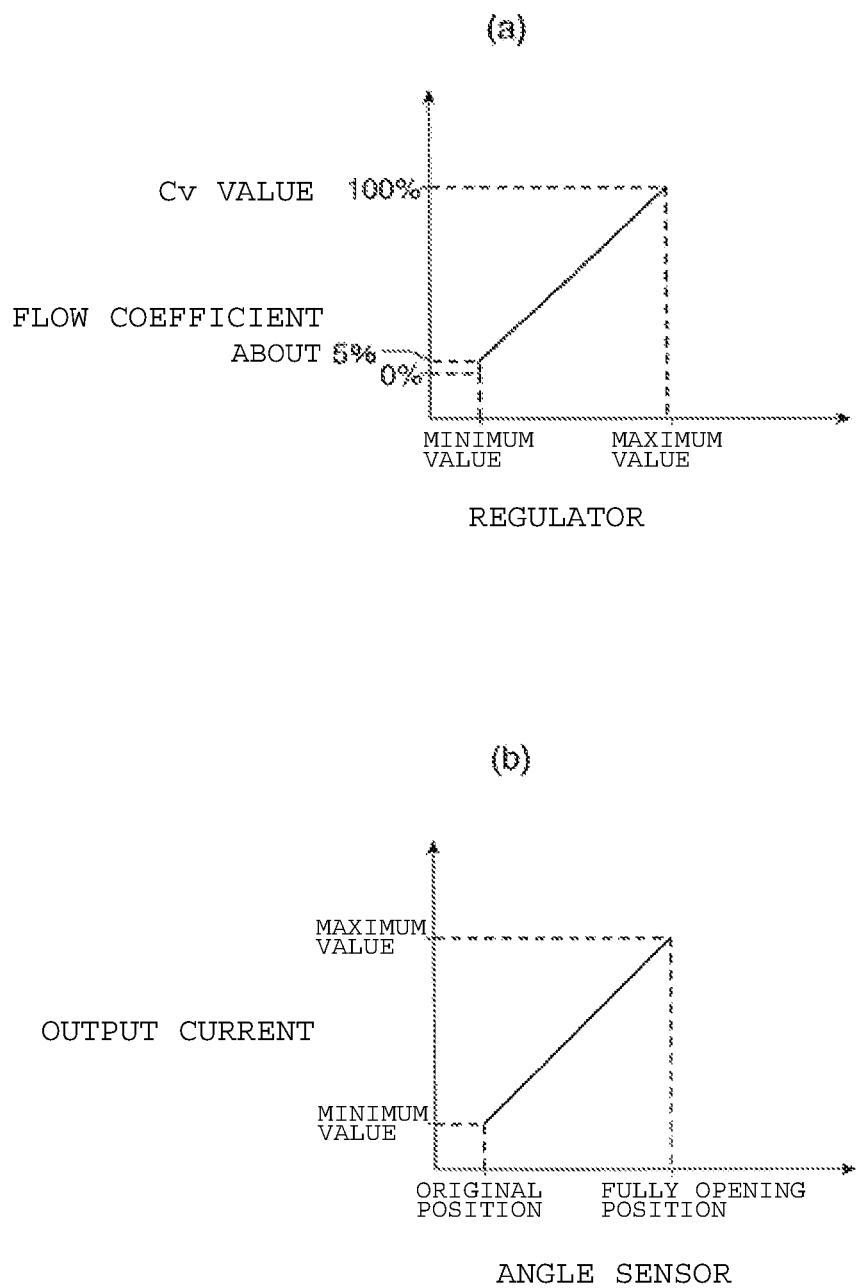
FIG. 22 are graphs for showing the operations of the flow rate control valve in the first embodiment of the present invention.

After that, in the two-way motor valve 1, along with rotation of the valve shaft 12, the opening area of the second valve port 11 serving as the opening portion changes (Step 405). As shown in FIG. 22(a), a flow coefficient Cv value changes in accordance with the opening area of the second valve port 11 by adjusting the output current output from the regulator 94 (Step 406). At this time, when the output current output from the regulator 94 has the minimum value, it is ideal that the flow coefficient Cv value becomes zero. However, there is a case in which the flow coefficient Cv value does not become zero completely and is confined to a value of about 5%. Such a case in which a minimum value of the flow coefficient Cv value is confined to the value of about 5% is also allowable.

Further, in the two-way motor valve 1, as illustrated in FIG. 21, the output voltage of the angle sensor 74 changes in accordance with the rotation angle of the rotation shaft 35 of the angle sensor 74 (Step 407). Further, as shown in FIG. 22(b), a value of the output current output from the opening degree output unit 96 of the control board 84 changes (Step 408).

Figure 23:
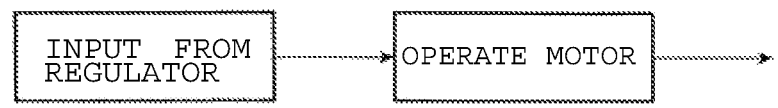
FIG. 23 is a block diagram for illustrating the operations of the flow rate control valve in the first embodiment of the present invention.
Figure 24:
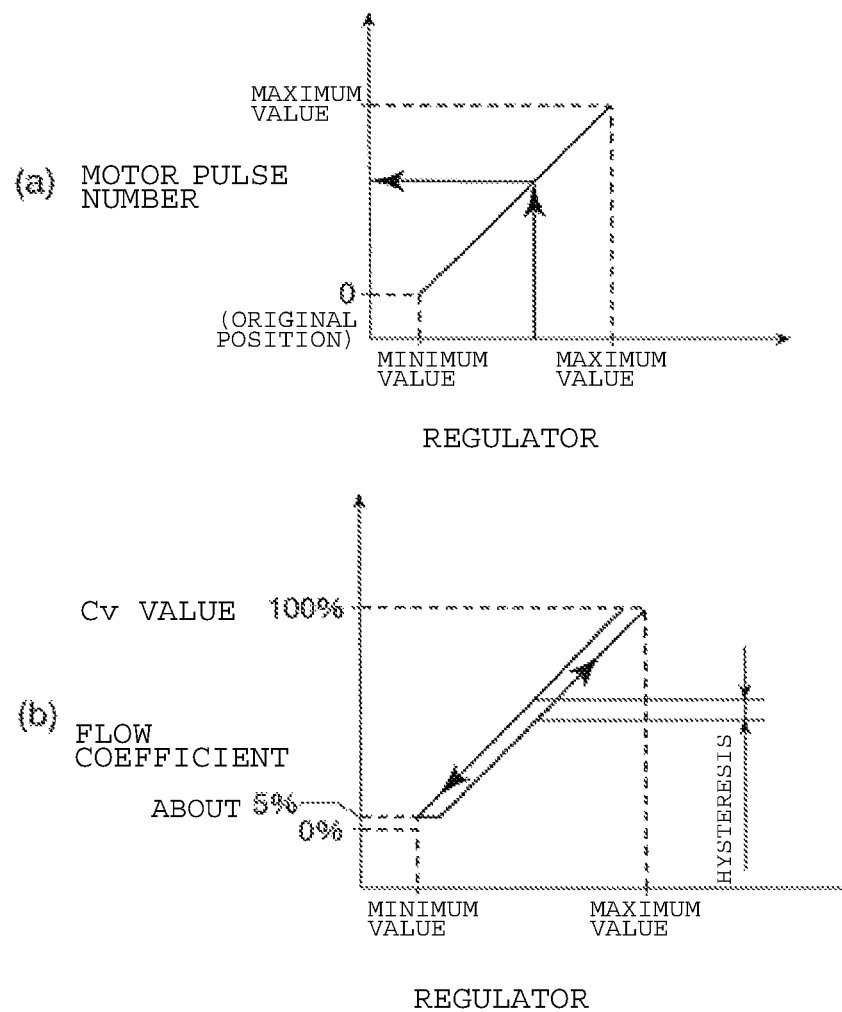
FIG. 24 are graphs for showing the operations of the flow rate control valve in the first embodiment of the present invention.

When the actual operating mode is executed by the open-loop control, as illustrated in FIG. 23, in order to control the flow rate, the output current is input from the regulator 94 of the external device 91 to the motor valve 1 for flow rate control. The drive pulse is output from the control board 84 to the drive motor 57 based on the electric current input from the regulator 94 of the external device 91. As shown in FIG. 24(a) and FIG. 24(b), the valve shaft 12 is turned to a position of a motor pulse number corresponding to the input current, and the flow coefficient Cv value is controlled to a value corresponding to the input current from the regulator 94. Further, the two-way motor valve 1 outputs the output current from the opening degree output unit 96 in accordance with the voltage of the angle sensor 74 corresponding to the position of the valve shaft 12.

At this time, in a case in which the two-way motor valve 1 is in an unadjusted state, when there is a deviation between the output current output from the regulator 94 of the external device 91, and the input current input to the regulator input unit 95 of the control board 84 and detected by the control board 84, the input current detected by the regulator input unit 95 of the control board 84 is not sometimes equal to the electric current corresponding to the fully closing position of the valve shaft 12 even when, for example, the electric current corresponding to the fully closing position of the valve shaft 12 is output from the regulator 94 of the external device 91.

In contrast, in this embodiment, as shown in FIG. 17, the minimum value and the maximum value of the output currents output from the regulator 94 of the external device 91 are stored in advance in the ROM 103 of the control board 84. Accordingly, when the regulator 94 of the external device 91 outputs the output current of the minimum value, the control board 84 detects that the valve shaft 12 is at the fully closing position, and sets the drive pulse, which is to be output to the drive motor 57, to a position of zero. Further, when the regulator 94 of the external device 91 outputs the output current of the maximum value, the control board 84 detects that the valve shaft 12 is at the fully opening position, and sets the drive pulse, which is to be output to the drive motor 57, to a position of the maximum value. In addition, when the regulator 94 of the external device 91 outputs a predetermined output current, as shown in FIG. 24(a), the control board 84 outputs, to the drive motor 57, the drive pulse number corresponding to the predetermined output current.

Therefore, when the two-way motor valve 1 according to this embodiment is operated under the open-loop control, as shown in FIG. 24(b), the valve shaft 12 can be rotated to a position corresponding to the output current output from the regulator 94 of the external device 91, and the flow rate of the fluid is controlled based on the flow coefficient Cv value determined in accordance with the rotation angle of the valve shaft 12.

At this time, in the open-loop control, as shown in FIG. 24(a), the drive pulse output to the drive motor 57 in accordance with the output current of the regulator 94 is linearly controlled, and the rotation shaft 35 is stably driven by the drive motor 57 through the reduction gear device 58. Further, in the open-loop control, as shown in FIG. 24(b), the output of the angle sensor 74 is not fed back to driving of the drive motor 57. Accordingly, such a hysteresis phenomenon occurs that there is a difference in the flow coefficient Cv value between driving the valve shaft 12 to an opening position, and driving the valve shaft 12 from an opening/closing position to a closing position.

Closed-Loop Control

Figure 25:
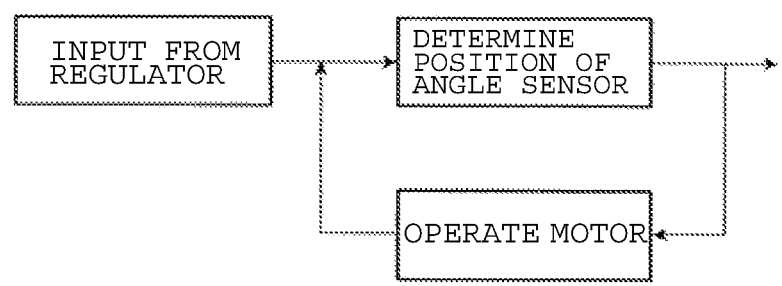
FIG. 25 is a block diagram for illustrating the operations of the flow rate control valve in the first embodiment of the present invention.

In the two-way motor valve 1 according to this embodiment, when the actual operating mode is executed by the closed-loop control, as illustrated in FIG. 25, the input current is input from the regulator 94 to the regulator input unit 95 of the control board 84.

Figure 26:
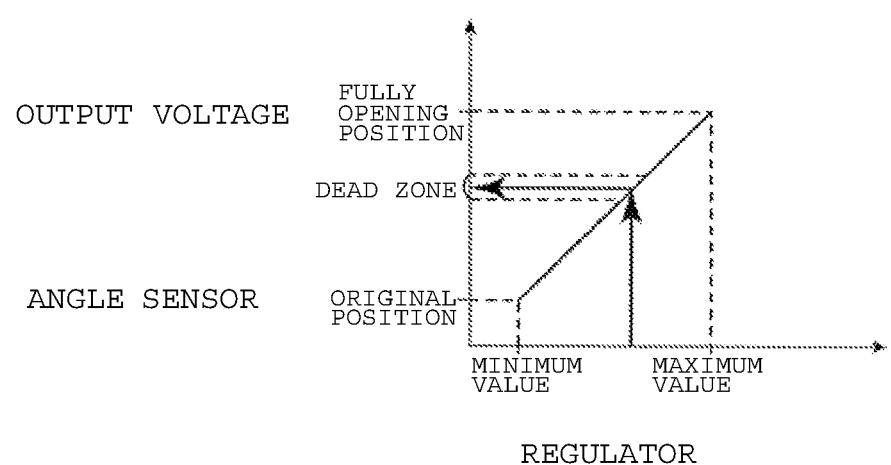
FIG. 26 is a graph for showing the operations of the flow rate control valve in the first embodiment of the present invention.

The CPU 101 of the control board 84 prepares a linear correction formula based on digital values as the minimum value and the maximum value of the input currents input from the regulator 94 and stored in the RAM 103, and based on digital values of the output voltages that correspond to the original position and the fully opening position and are output from the angle sensor 74 and stored in the RAM 103. As shown in FIG. 26, the drive motor 57 is turned in accordance with the input current from the regulator 94 so that the output voltage of the angle sensor 74 remains within a dead zone. Herein, the dead zone refers to a finite range of an input change where no detectable change is caused as a change in the output value.

As described above, in the closed-loop control, the angle sensor 74 detects the rotation angle of the rotation shaft 35 resulting from driving of the drive motor 57, and the output voltage of the angle sensor 74 is fed back, thereby being capable of controlling a driving amount of the drive motor 57. Accordingly, the rotation angle of the valve shaft 12 can be adjusted with good accuracy.

Figure 27:
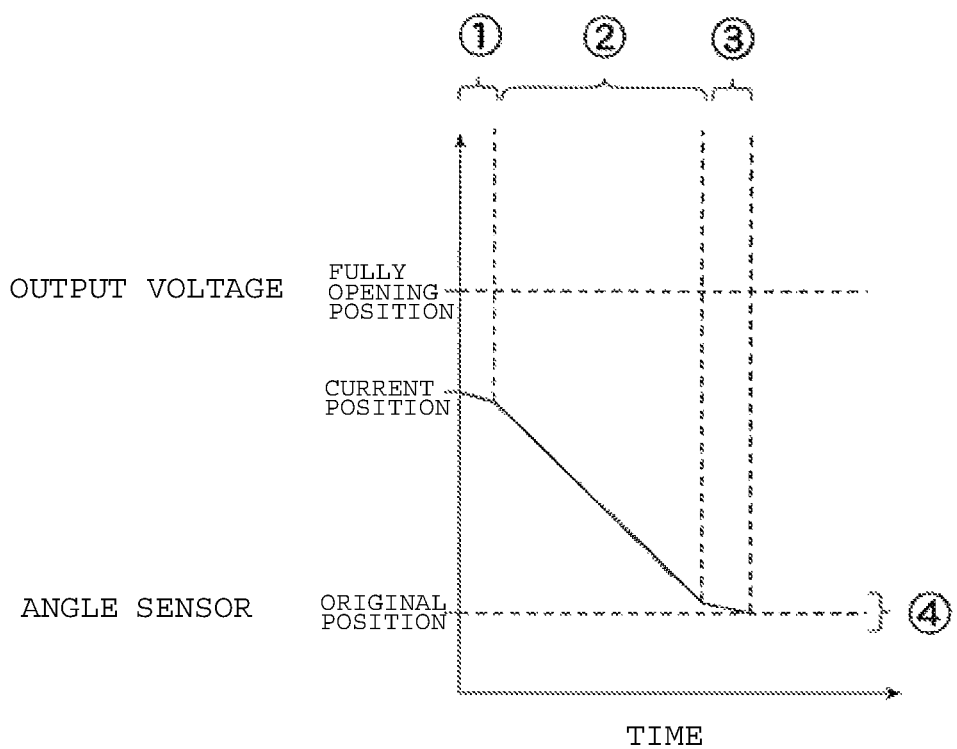
FIG. 27 is a graph for showing the operations of the flow rate control valve in the first embodiment of the present invention.

Further, as shown in FIG. 27, the two-way motor valve 1 according to this embodiment is configured to drive the drive motor 57 at low speed under a state of reducing the drive pulse per unit time that is output at the time of start of driving of the drive motor 57. After the start of driving of the drive motor 57, the drive pulse per unit time is output at normal speed. Similarly, the two-way motor valve 1 according to this embodiment is configured to drive the drive motor 57 at low speed under a state of reducing the drive pulse per unit time that is output at the time of stop of driving of the drive motor 57.

With this configuration, immediately before the original position, the drive pulse number output per unit time is reduced again so that the operation is performed at low speed. Thus, in order to stop the valve shaft 12 at the original position, when the drive pulse corresponding to the input current from the regulator 94 is output to the drive motor 57 to cause the drive motor 57 to turn the valve shaft 12, and the output voltage from the angle sensor 74 is fed back in accordance with the position of the valve shaft 12, hunting caused by repetition of overshoots in which the drive motor 57 is turned excessively based on the output voltage from the angle sensor 74, and undershoots in which the excessively turned drive motor 57 is turned in a reverse direction can be prevented.

As described above, the above-mentioned two-way motor valve 1 according to the first embodiment can control the rotation angle of the valve shaft 12 with good accuracy.

As shown in FIG. 6(a), for example, in an initial state of the two-way motor valve 1 before start of operation, the valve operating portion 22 of the valve shaft 12 closes (fully closes) the second valve port 11.

As illustrated in FIG. 2, in the two-way motor valve 1, when the stepping motor 57 provided in the actuator 3 is rotated and driven by a predetermined amount, the rotation shaft 35 is rotated and driven in accordance with a rotation amount of the stepping motor 57. In the two-way motor valve 1, when the rotation shaft 35 is rotated and driven, the valve shaft 12 coupled and fixed to the rotation shaft 35 is rotated by an angle equal to the rotation amount (rotation angle) of the rotation shaft 35. Along with rotation of the valve shaft 12, the valve operating portion 22 is rotated inside the valve seat 8. As illustrated in FIG. 6, one end portion 21a of the valve operating portion 22 in the circumferential direction gradually opens the second valve port 11 so that the fluid flowing through the first inflow port 7 flows into the valve seat 8 through the first valve port 9.

The fluid having flowed into the two-way motor valve 1 is supplied from the outflow port 10 to an outside of the two-way motor valve 1 through the second valve port 11 in accordance with the rotation angle of the valve shaft 12.

In the two-way motor valve 1, each of the both end portions 21a and 21b of the valve operating portion 22 in the circumferential direction is formed into a flat-surface shape. Thus, the opening area of the second valve port 11 can be linearly changed with respect to the rotation angle of the valve shaft 12.

Experimental Example 1

The inventors of the present invention experimentally produced the two-way motor valves 1 each including the valve shafts 12 as illustrated in FIG. 1 to FIG. 3, and carried out an experiment to check how a flow coefficient Cv value of the fluid changes in accordance with the opening degree of the second valve port 11 along with the rotation of the valve shaft 12.

FIG. 28(a) and FIG. 28(b) are graphs for showing results of the above-mentioned experimental example. In FIG. 28(a), values of the output currents output from the external device 91 are shown. In FIG. 28(b), the flow coefficient Cv values of the two-way motor valve 1 are shown.

Figure 28:
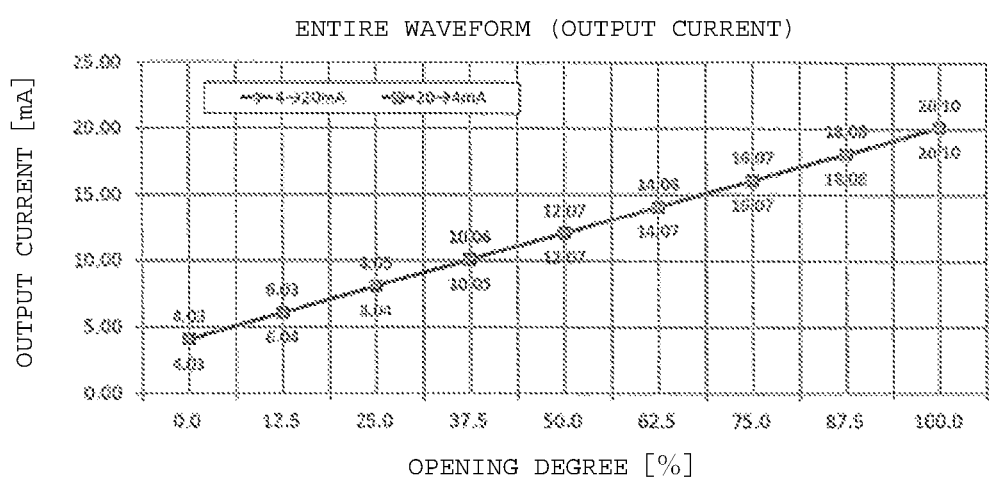
FIG. 28 are graphs for showing results of Experimental Example 1.
Figure 28:
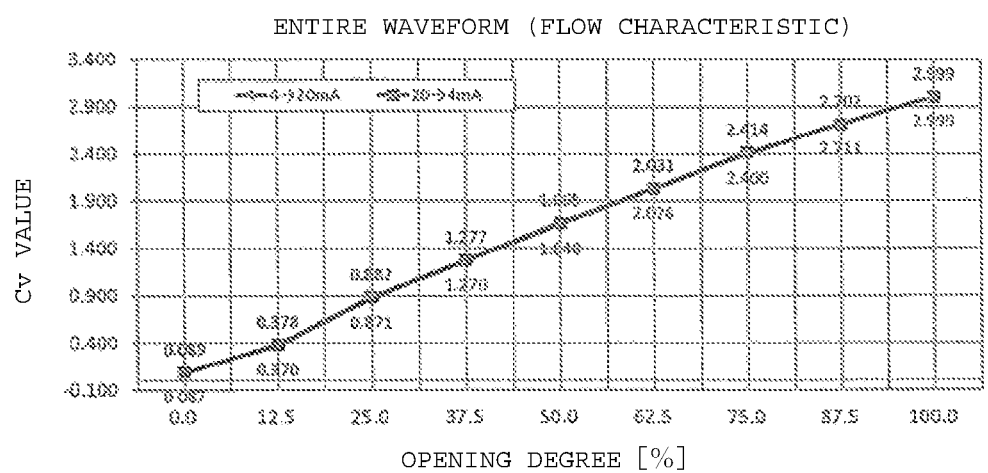

As a result, as is apparent from the graphs shown in FIG. 28(a) and FIG. 28(b), the flow coefficient Cv value of the fluid was substantially linearly increased or decreased along with the rotation angle of the valve shaft 12. Thus, it has been found out that the flow rate of the fluid can be controlled with good accuracy. In the graphs shown in FIG. 28, there are shown both a case of changing the two-way motor valve 1 from a fully closed state to a fully opened state, and a case of changing the two-way motor valve 1 from the fully opened state to the fully closed state.

Example 1

Figure 29:
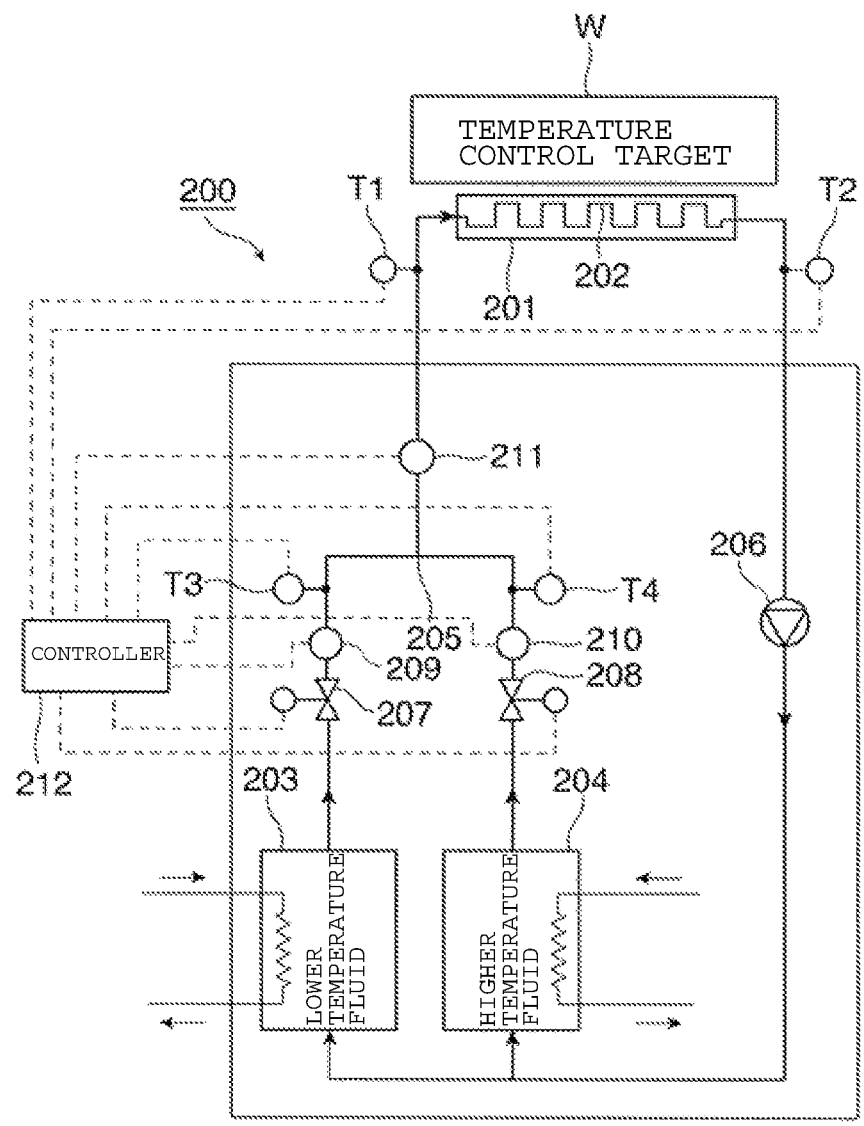
FIG. 29 is a configuration diagram for illustrating a temperature control device according to the first embodiment of the present invention.

FIG. 29 is a schematic diagram for illustrating a constant-temperature maintaining device (chiller device) as one example of a temperature control device, to which the two-way valve for flow rate control according to the first embodiment of the present invention is applied.

A chiller device 200 is, for example, used for a semiconductor manufacturing apparatus involving plasma etching, and configured to maintain a temperature of a semiconductor wafer or the like as one example of a temperature control target W to a constant temperature. The temperature control target W, for example, a semiconductor wafer, may rise in temperature along with generation or discharge of plasma or the like after being subjected to plasma etching or the like.

The chiller device 200 includes a temperature control portion 201 formed into a table-like shape as one example of the temperature control means arranged so as to be held in contact with the temperature control target W. The temperature control portion 201 has a flow passage 202 for temperature control therein. The fluid for temperature control, which includes the lower temperature fluid and the higher temperature fluid having been adjusted in mixture ratio, flows through the flow passage 202 for temperature control.

A constant-temperature reservoir 203 for lower temperature and a constant-temperature reservoir 204 for higher temperature are connected to the flow passage 202 for temperature control of the temperature control portion 201. The constant-temperature reservoir 203 for lower temperature stores the lower temperature fluid adjusted to a predetermined lower temperature, and the constant-temperature reservoir 204 for higher temperature stores the higher temperature fluid adjusted to a predetermined higher temperature. After the lower temperature fluid supplied from the constant-temperature reservoir 203 for lower temperature, and the higher temperature fluid supplied from the constant-temperature reservoir 204 for higher temperature are mixed in a mixing portion 205, the resulting fluid is fed to the flow passage 202 for temperature control of the temperature control portion 201. The lower temperature fluid supplied from the constant-temperature reservoir 203 for lower temperature is fed to the mixing portion 205 through a first two-way motor valve 207 as one example of the two-way valve for flow rate control. Further, the higher temperature fluid supplied from the constant-temperature reservoir 204 for higher temperature is fed to the mixing portion 205 through a second two-way motor valve 208 as one example of the two-way valve for flow rate control. The fluid for temperature control having flowed through the flow passage 202 for temperature control of the temperature control portion 201 is caused to flow through the constant-temperature reservoir 203 for lower temperature and the constant-temperature reservoir 204 for higher temperature by a pump 206. It is not always necessary that the constant-temperature reservoir 203 for lower temperature and the constant-temperature reservoir 204 for higher temperature store the lower temperature fluid and the higher temperature fluid, respectively. Any reservoir may be used as long as the reservoir can adjust the fluid to a desired temperature and supply the resulting fluid. In this case, each of the constant-temperature reservoir 203 for lower temperature and the constant-temperature reservoir 204 for higher temperature may be constructed by a condenser, an evaporator, or the like through which the lower temperature fluid or the higher temperature fluid flows.

A first temperature sensor T1 and a second temperature sensor T2 are provided on an inflow side and an outflow side of the flow passage 202 for temperature control of the temperature control portion 201, respectively. Further, a first flow meter 209 configured to measure the flow rate of the lower temperature fluid, and a third temperature sensor T3 configured to measure a temperature of the lower temperature fluid are arranged on a downstream side of the first two-way motor valve 207. Meanwhile, a second flow meter 210 configured to measure the flow rate of the higher temperature fluid, and a fourth temperature sensor T4 configured to measure a temperature of the higher temperature fluid are arranged on a downstream side of the second two-way motor valve 208. In addition, a third flow meter 211 configured to measure the flow rate of the fluid for temperature control is arranged on a downstream side of the mixing portion 205. The first temperature sensor T1, the second temperature sensor T2, the first flow meter 209, the second flow meter 210, the third temperature sensor T3, and the fourth temperature sensor T4 are connected to a controller 212. The controller 212 controls the first two-way motor valve 207 and the second two-way motor valve 208.

Figure 30:
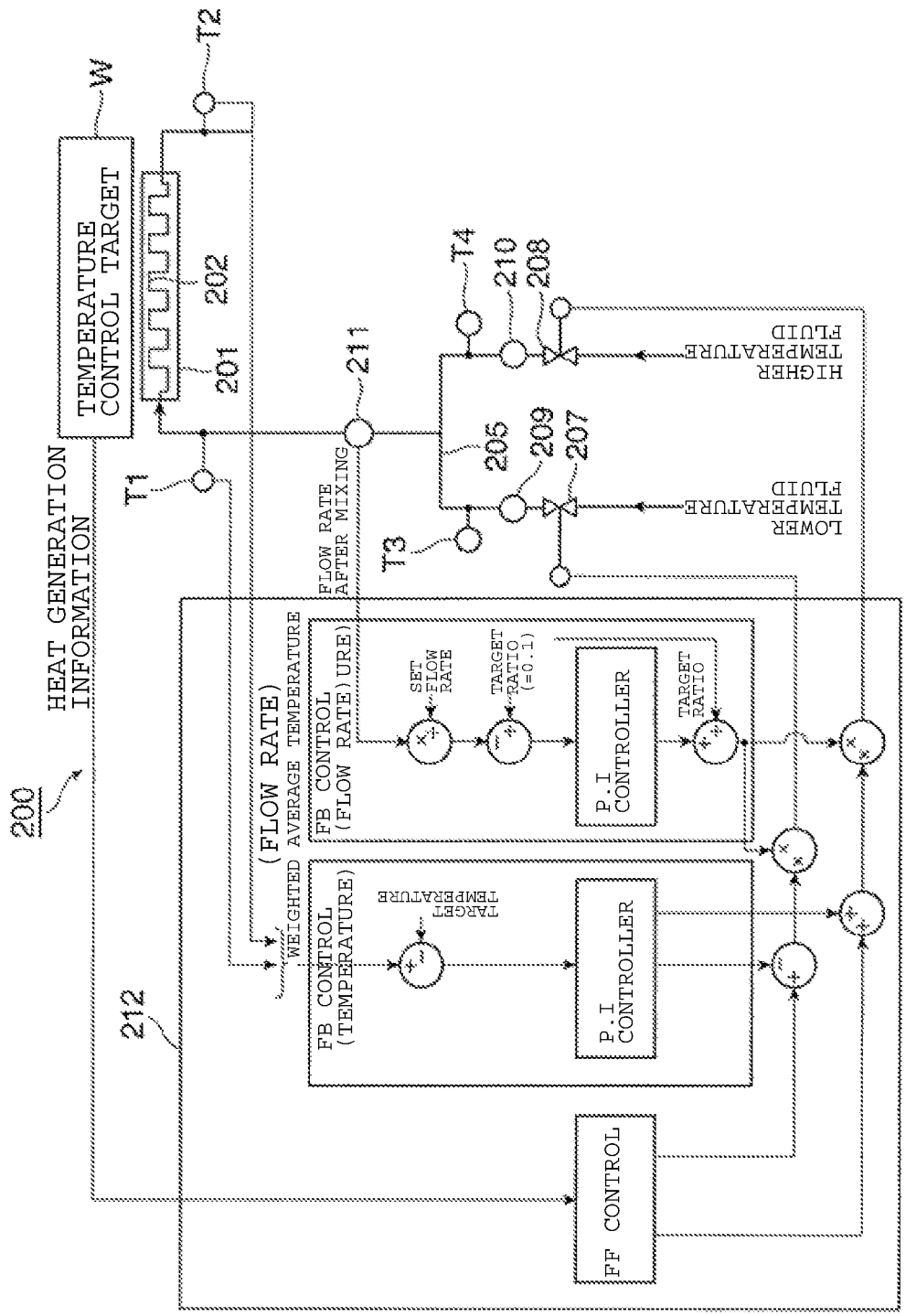
FIG. 30 is a block diagram for illustrating the temperature control device according to the first embodiment of the present invention.

FIG. 30 is a block diagram for illustrating a control system of the controller.

The controller 212 adjusts opening degrees of the first two-way motor valve 207 and the second two-way motor valve 208 based on a heat generating amount Q of the temperature control target W, the flow rate of the fluid for temperature control measured by the third flow meter 211, measurement values measured by the first temperature sensor T1 and the second temperature sensor T2, and a target value of a weighted average temperature of the temperature control target W, and estimates a temperature change of the temperature control target W based on a predetermined relational expression, thereby performing feed-forward (FF) control on the flow rates of the lower temperature fluid and the higher temperature fluid. The heat generating amount Q of the temperature control target W is numerically expressed by electric power or the like used during processing of the temperature control target W.

Further, as illustrated in FIG. 30, the controller 212 causes a PI controller to execute a PI calculation or the like based on the flow rate of the fluid for temperature control measured by the third flow meter 211, thereby adjusting the opening degrees of the first two-way motor valve 207 and the second two-way motor valve 208 and performing feedback (FB) control on the flow rates of the lower temperature fluid and the higher temperature fluid. In addition, the controller 212 causes the PI controller to execute the PI calculation or the like based on the measurement values measured by the first temperature sensor T1 and the second temperature sensor T2, thereby adjusting the opening degrees of the first two-way motor valve 207 and the second two-way motor valve 208 and performing feedback (FB) control on a temperature of the fluid for temperature control formed of a mixture of the lower temperature fluid and the higher temperature fluid.

Through rotational driving of the valve shaft 12 by the stepping motor 57 based on a control signal output from the controller 212, the first two-way motor valve 207 controls the flow rate of the lower temperature fluid supplied from the constant-temperature reservoir 203 for lower temperature, and the second two-way motor valve 208 controls the flow rate of the higher temperature fluid supplied from the constant-temperature reservoir 204 for higher temperature.

Thus, the first two-way motor valve 207 and the second two-way motor valve 208 control the temperature of the fluid for temperature control formed of the mixture of the lower temperature fluid and the higher temperature fluid, which is to be supplied to the flow passage 202 for temperature control of the temperature control portion 201 through the mixing portion 205.

At this time, as shown in FIG. 28, the first two-way motor valve 207 and the second two-way motor valve 208 are capable of controlling the flow rate of the lower temperature fluid and the higher temperature fluid in accordance with the rotation angle of the valve shaft 12 with high accuracy, thereby being capable of finely adjusting a temperature of the fluid for temperature control. Thus, the chiller device 200 using the two-way motor valve 207 and two-way motor valve 208 according to this embodiment is capable of controlling a temperature of the temperature control target W, which is held in contact with the temperature control portion 201, to a desired temperature, by allowing the fluid for temperature control, which is controlled in mixture ratio between the lower temperature fluid and the higher temperature fluid and adjusted in temperature to a predetermined temperature, to flow through the flow passage 202 for temperature control in the temperature control portion 201.

Experimental Example 2

The inventors of the present invention experimentally produced the chiller device 200 as illustrated in FIG. 29, and carried out an experiment to check changes in temperature and flow rate of a fluid flowing through the flow passage 202 for temperature control of the temperature control portion 201.

Figure 31:
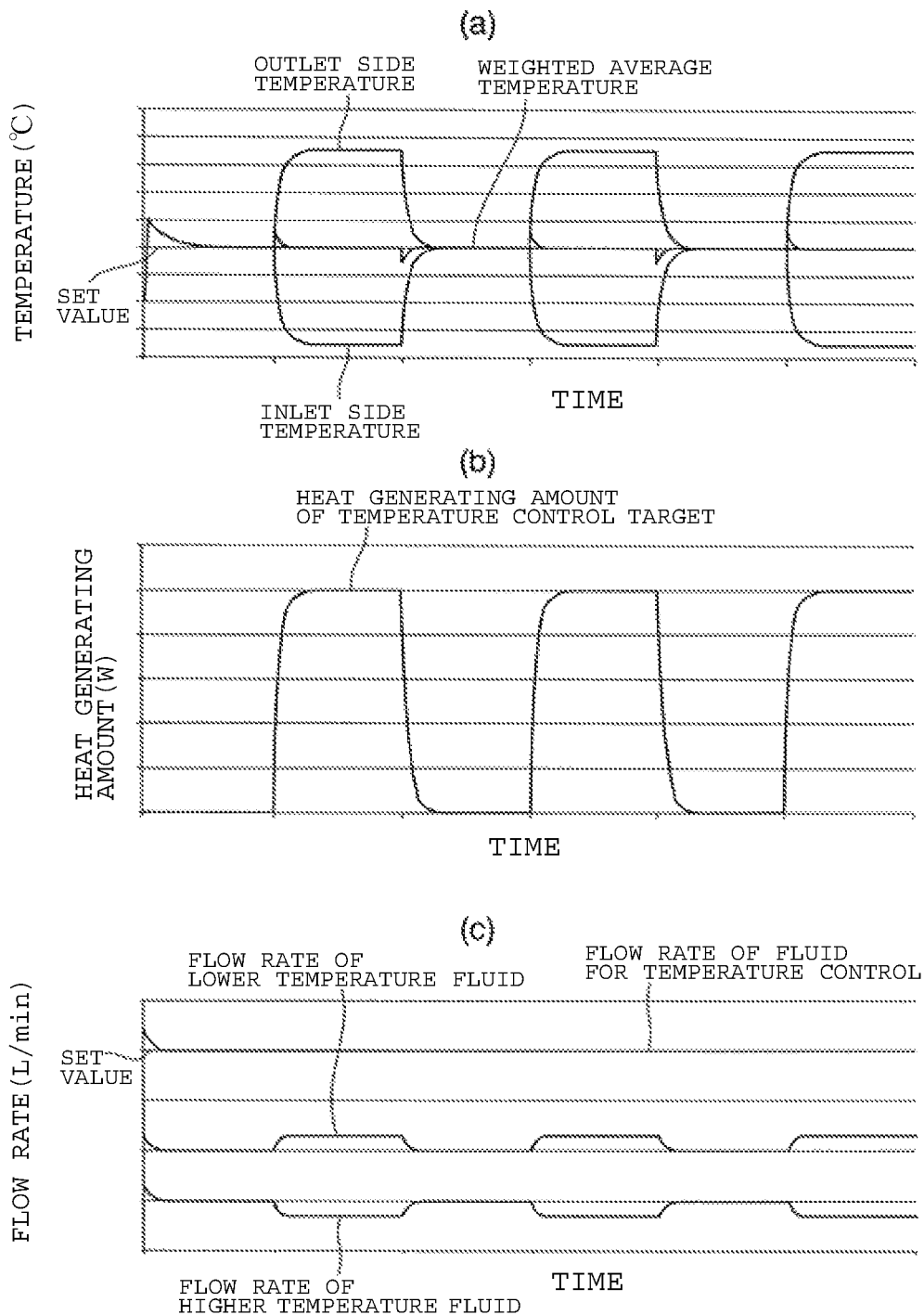
FIG. 31 are graphs for showing results of Experimental Example 2.

FIG. 31 are graphs for showing results of Experimental Example 2 above.

As is apparent from FIG. 31, according to the chiller device 200 of Experimental Example 2, even when the heat generating amount Q of the temperature control target W changes, it is found out that the temperature and the flow rate of the fluid flowing through the flow passage 202 for temperature control of the temperature control portion 201 can be controlled to values substantially equal to set values.

In the above-mentioned embodiment, description is made of the case in which the first valve port is formed on the inflow side and the second valve port is formed on the outflow side. The second valve port may be formed on the inflow side, and the first valve port may be formed on the outflow side. However, a configuration of forming the first valve port on the inflow side is desired in view of the operations of the valve shaft 12 because a pressure of the fluid is equally applied to the valve shaft 12.

INDUSTRIAL APPLICABILITY

The two-way valve for flow rate control is capable of controlling the flow rate of the two kinds of fluids linearly, with high accuracy. Through use of the two-way valve for flow rate control in the temperature control device, a temperature of the temperature control target can be controlled with high accuracy.

REFERENCE SIGNS LIST 1 two-way motor valve
2 valve portion
3 actuator
4 sealing portion
5 coupling portion
6 valve main body
7 inflow port
8 valve seat
9 first valve port
10 outflow port
11 second valve port
12 valve shaft

The invention claimed is:

1. A two-way valve for flow rate control, comprising:
a valve main body, which includes a valve seat having a columnar space, and has a first valve port formed in one end portion of the valve main body in an axial direction of the valve seat so as to allow flow of a fluid, and a second valve port that is formed in a peripheral wall of the valve seat to allow flow of the fluid and has a rectangular cross section;
a valve element having a shape forming a part of a cylindrical shape having a predetermined central angle and having a rectangular half-cylindrical shape opening, the valve element arranged in the valve seat of the valve main body such that i) the valve element is freely rotatable, and ii) the rectangular half-cylindrical shape opening linearly changes an opening area of the second valve port as the valve element is rotated;
and drive means configured to rotate and drive the valve element.

2. A two-way valve for flow rate control according to claim 1,
wherein the valve element is formed of a cylindrical body having a half-cylindrical portion, which is formed into a half-cylindrical shape having a predetermined central angle by opening an outer peripheral surface of the cylindrical body, and having one end surface thereof in an axial direction being closed and another end surface being opened.

3. A temperature control device, comprising:
temperature control means having a flow passage for temperature control which allows a fluid for temperature control to flow therethrough, the fluid for temperature control including a lower temperature fluid and a higher temperature fluid adjusted in a mixture ratio;
first supply means configured to supply the lower temperature fluid adjusted to a first predetermined lower temperature;
second supply means configured to supply the higher temperature fluid adjusted to a second predetermined higher temperature;
a mixing portion configured to mix the lower temperature fluid supplied from the first supply means and the higher temperature fluid supplied from the second supply means, and then cause a mixture of the lower temperature fluid and the higher temperature fluid to flow to the flow passage for temperature control;
a first flow rate control valve configured to control a flow rate of the lower temperature fluid supplied from the first supply means; and
a second flow rate control valve configured to control a flow rate of the higher temperature fluid supplied from the second supply means,
wherein the two-way valve for flow rate control of claim 1 is used as each of the first flow rate control valve and the second flow rate control valve.

* * * * *